US012340748B2

(12) United States Patent
Synn et al.

(10) Patent No.: US 12,340,748 B2
(45) Date of Patent: Jun. 24, 2025

(54) DISPLAY DEVICE, AND METHOD OF OPERATING A DISPLAY DEVICE

(71) Applicant: SAMSUNG DISPLAY CO., LTD., Yongin-si (KR)

(72) Inventors: Seungyong Synn, Yongin-si (KR); Young Seob Kim, Yongin-si (KR); Taewook Kim, Yongin-si (KR); Byungchang Shim, Yongin-si (KR); Jungsun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/615,015

(22) Filed: Mar. 25, 2024

(65) Prior Publication Data

US 2025/0061852 A1 Feb. 20, 2025

(30) Foreign Application Priority Data

Aug. 14, 2023 (KR) ........................ 10-2023-0106539

(51) Int. Cl.
*G09G 3/32* (2016.01)
*G09G 3/3233* (2016.01)

(52) U.S. Cl.
CPC ............. *G09G 3/3233* (2013.01); *G09G 3/32* (2013.01); *G09G 2310/0245* (2013.01); *G09G 2310/061* (2013.01); *G09G 2310/08* (2013.01); *G09G 2330/021* (2013.01); *G09G 2330/027* (2013.01)

(58) Field of Classification Search
CPC ... G09G 2300/0426; G09G 2310/0251; G09G 2310/027; G09G 2310/0275; G09G 2310/08; G09G 2320/0285; G09G 2320/0673; G09G 2330/021; G09G 2330/028; G09G 3/2022; G09G 3/204; G09G 3/348
See application file for complete search history.

(56) References Cited

U.S. PATENT DOCUMENTS

2009/0140964 A1* 6/2009 Chiang ................ G09G 3/3648 345/87
2010/0134530 A1* 6/2010 Lee ...................... G09G 3/3688 345/88

FOREIGN PATENT DOCUMENTS

KR 10-2017-0121378 A 11/2017
KR 10-2018-0071572 A 6/2018
KR 10-2246262 B1 4/2021

* cited by examiner

*Primary Examiner* — Insa Sadio
(74) *Attorney, Agent, or Firm* — F. CHAU & ASSOCIATES, LLC

(57) ABSTRACT

A display device includes a display panel, and a panel driver configured to drive the display panel. In an active period of a frame period, the panel driver generates data voltages based on a gamma voltage, provides the data voltages to a plurality of pixels through a plurality of data lines, and provides scan signals having a gate-on voltage to the plurality of pixels through a plurality of scan lines. In a black period of the frame period, the panel driver outputs a black data voltage to the plurality of data lines, and outputs a gate-off voltage to the plurality of scan lines. In a display-off period, the panel driver outputs the gamma voltage to the plurality of data lines, outputs the gate-off voltage to the plurality of scan lines, and adjusts at least one of the gamma voltage and the gate-off voltage.

20 Claims, 21 Drawing Sheets

FIG. 10B

| DISPLAY DEVICE | DEV1 | DEV2 |
|---|---|---|
| VREG | 6.8 V | 6.8 V |
| VBLACK | 6.4 V | 6.2 V |
| VGH | 6.9 V | 6.9 V |
| VREG" | 6.4 V | 6.2 V |

FIG. 15B

| DISPLAY DEVICE | DEV1 | DEV2 |
|---|---|---|
| VREG | 6.8 V | 6.8 V |
| VBLACK | 6.4 V | 6.6 V |
| VGH | 6.9 V | 6.9 V |
| VREG" | 6.4 V | 6.6 V |
| VGH" | 7.0 V | 7.2 V |

FIG. 16

| DIMMING LEVEL | DBV1 (500 nit) | DBV2 (250 nit) | DBV3 (110 nit) | DBV4 (80 nit) | DBV5 (40 nit) | DBV6 (20 nit) |
|---|---|---|---|---|---|---|
| VREG | 6.8 V | 6.8 V | 6.8 V | 6.8 V | 6.8 V | 6.8 V |
| VBLACK | 6.4 V | 6.3 V | 6.2 V | 6.1 V | 6.0 V | 5.9 V |
| VGH | 6.9 V | 6.9 V | 6.9 V | 6.9 V | 6.9 V | 6.9 V |
| VREG" | 6.4 V | 6.3 V | 6.2 V | 6.1 V | 6.0 V | 5.9 V |
| VGH" | 7.0 V | 6.9 V | 6.8 V | 6.7 V | 6.6 V | 6.5 V |

DISPLAY DEVICE, AND METHOD OF OPERATING A DISPLAY DEVICE

CROSS-REFERENCE TO RELATED APPLICATIONS

This application claims priority under 35 U.S.C. § 119 to Korean Patent Application No. 10-2023-0106539, filed on Aug. 14, 2023 in the Korean Intellectual Property Office (KIPO), the disclosure of which is incorporated by reference herein in its entirety.

TECHNICAL FIELD

Embodiments of the present inventive concept relate to a display device, and more particularly, to a display device capable of preventing flashing in a display-off period, and a method of operating the display device.

DISCUSSION OF RELATED ART

When static electricity is induced to a display panel of a display device, a threshold voltage of a transistor of each pixel of the display panel may be shifted (e.g., positively shifted), and a leakage current through the transistor may be generated due to the threshold voltage shift. Further, luminance of the pixel may be distorted due to this leakage current.

For example, in a display-off period in which the display panel does not display an image, flashing (e.g., greenish flashing) of the display panel may occur due to the leakage current.

SUMMARY

Some embodiments provide a display device capable of preventing flashing in a display-off period.

Some embodiments provide a method of operating a display device capable of preventing flashing in a display-off period.

According to embodiments, there is provided a display device including a display panel including a plurality of data lines, a plurality of scan lines, and a plurality of pixels connected to the plurality of data lines and the plurality of scan lines, and a panel driver configured to drive the display panel. In an active period of a frame period, the panel driver generates data voltages based on a gamma voltage, provides the data voltages to the plurality of pixels through the plurality of data lines, and provides scan signals having a gate-on voltage to the plurality of pixels through the plurality of scan lines. In a black period of the frame period, the panel driver outputs a black data voltage to the plurality of data lines, and outputs a gate-off voltage to the plurality of scan lines. In a display-off period, the panel driver outputs the gamma voltage to the plurality of data lines, outputs the gate-off voltage to the plurality of scan lines, and adjusts at least one of the gamma voltage and the gate-off voltage.

In embodiments, the display-off period is between a display-on period and a sleep state period.

In embodiments, the display-off period is between a display-on period and a power-off period.

In embodiments, in the display-off period, the panel driver decreases the gamma voltage such that a difference between the gate-off voltage and the gamma voltage becomes greater than or equal to a predetermined voltage margin.

In embodiments, the panel driver adjusts the gamma voltage to a predetermined low gamma voltage in the display-off period.

In embodiments, the panel driver adjusts the gamma voltage to the black data voltage in the display-off period.

In embodiments, in the display-off period, the panel driver increases the gate-off voltage such that a difference between the gate-off voltage and the gamma voltage becomes greater than or equal to a predetermined voltage margin.

In embodiments, the panel driver adjusts the gate-off voltage to a predetermined high off voltage in the display-off period.

In embodiments, the panel driver adjusts the gate-off voltage to a voltage obtained by adding a predetermined voltage margin to the gamma voltage in the display-off period.

In embodiments, in the display-off period, the panel driver decreases the gamma voltage and increases the gate-off voltage such that a difference between the gate-off voltage and the gamma voltage becomes greater than or equal to a predetermined voltage margin.

In embodiments, in the display-off period, the panel driver adjusts the gamma voltage to the black data voltage, and adjusts the gate-off voltage to a voltage obtained by adding a predetermined voltage margin to the gamma voltage.

In embodiments, the black data voltage is set to a plurality of first voltage levels at a plurality of dimming levels, respectively. In the display-off period, the gamma voltage is adjusted to the plurality of first voltage levels at the plurality of dimming levels, the gate-off voltage is adjusted to a plurality of second voltage levels at the plurality of dimming levels, and the plurality of second voltage levels is higher by a predetermined voltage margin than the plurality of first voltage levels, respectively.

In embodiments, the panel driver selectively performs an operation of adjusting at least one of the gamma voltage and the gate-off voltage in response to a command received from an external host processor.

According to embodiments, there is provided a method of operating a display device. In the method, data voltages are generated based on a gamma voltage in an active period of a frame period, the data voltages are provided to a plurality of pixels through a plurality of data lines in the active period, scan signals having a gate-on voltage are provided to the plurality of pixels through a plurality of scan lines in the active period, a black data voltage is output to the plurality of data lines in a blank period of the frame period, a gate-off voltage is output to the plurality of scan lines in the blank period, the gamma voltage is output to the plurality of data lines in a display-off period, the gate-off voltage is output to the plurality of scan lines in the display-off period, and at least one of the gamma voltage and the gate-off voltage is adjusted in the display-off period.

In embodiments, to adjust at least one of the gamma voltage and the gate-off voltage, the gamma voltage is decreased such that a difference between the gate-off voltage and the gamma voltage becomes greater than or equal to a predetermined voltage margin in the display-off period.

In embodiments, to adjust at least one of the gamma voltage and the gate-off voltage, the gamma voltage is adjusted to a predetermined low gamma voltage in the display-off period.

In embodiments, to adjust at least one of the gamma voltage and the gate-off voltage, the gamma voltage is adjusted to the black data voltage in the display-off period.

In embodiments, to adjust at least one of the gamma voltage and the gate-off voltage, the gate-off voltage is increased such that a difference between the gate-off voltage and the gamma voltage becomes greater than or equal to a predetermined voltage margin in the display-off period.

In embodiments, to adjust at least one of the gamma voltage and the gate-off voltage, the gamma voltage is decreased in the display-off period, and the gate-off voltage is increased in the display-off period.

In embodiments, to adjust at least one of the gamma voltage and the gate-off voltage, the gamma voltage is adjusted to the black data voltage in the display-off period, and the gate-off voltage is adjusted to a voltage obtained by adding a predetermined voltage margin to the gamma voltage in the display-off period.

As described above, in a display device and a method of operating the display device according to embodiments, in a display-off period, at least one of a gamma voltage applied to a data line and a gate-off voltage applied to a scan line may be adjusted. Accordingly, in the display-off period, a leakage current in each pixel may be prevented, and flashing of a display panel caused by the leakage current may be prevented.

BRIEF DESCRIPTION OF THE DRAWINGS

The above and other features of the inventive concept will become more apparent by describing in detail embodiments thereof with reference to the accompanying drawings.

It will be understood that the terms “first,” “second,” “third,” etc. are used herein to distinguish one element from another, and the elements are not limited by these terms. Thus, a “first” element in an embodiment may be described as a “second” element in another embodiment.

It should be understood that descriptions of features or aspects within each embodiment should typically be considered as available for other similar features or aspects in other embodiments, unless the context clearly indicates otherwise.

As used herein, the singular forms “a”, “an” and “the” are intended to include the plural forms as well, unless the context clearly indicates otherwise.

The term “about” as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, “about” may mean within one or more standard deviations as understood by one of the ordinary skill in the art. Further, it is to be understood that while parameters may be described herein as having “about” a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Figure 1:
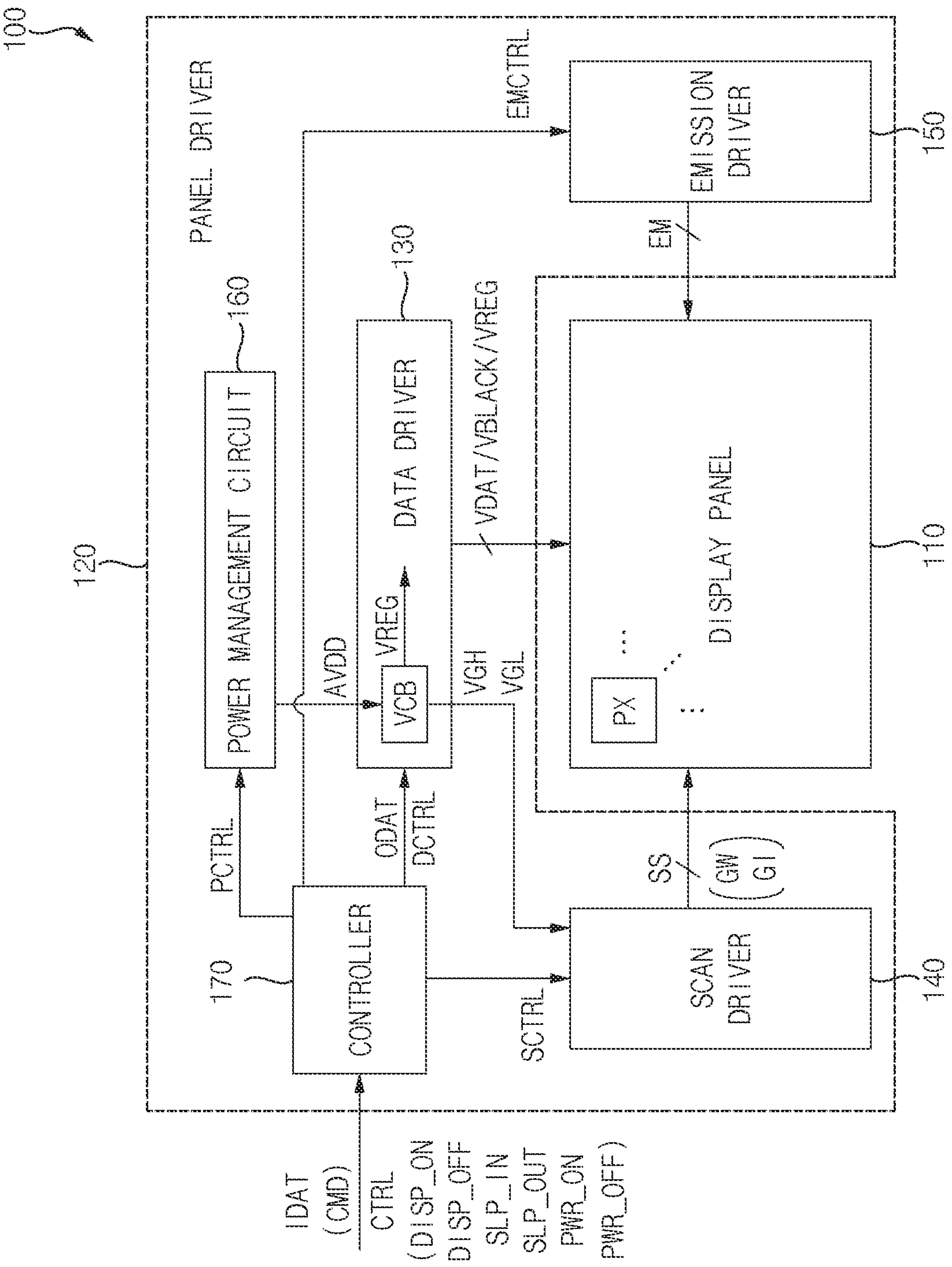

FIG. 1 is a block diagram illustrating a display device according to embodiments.

Figure 2:
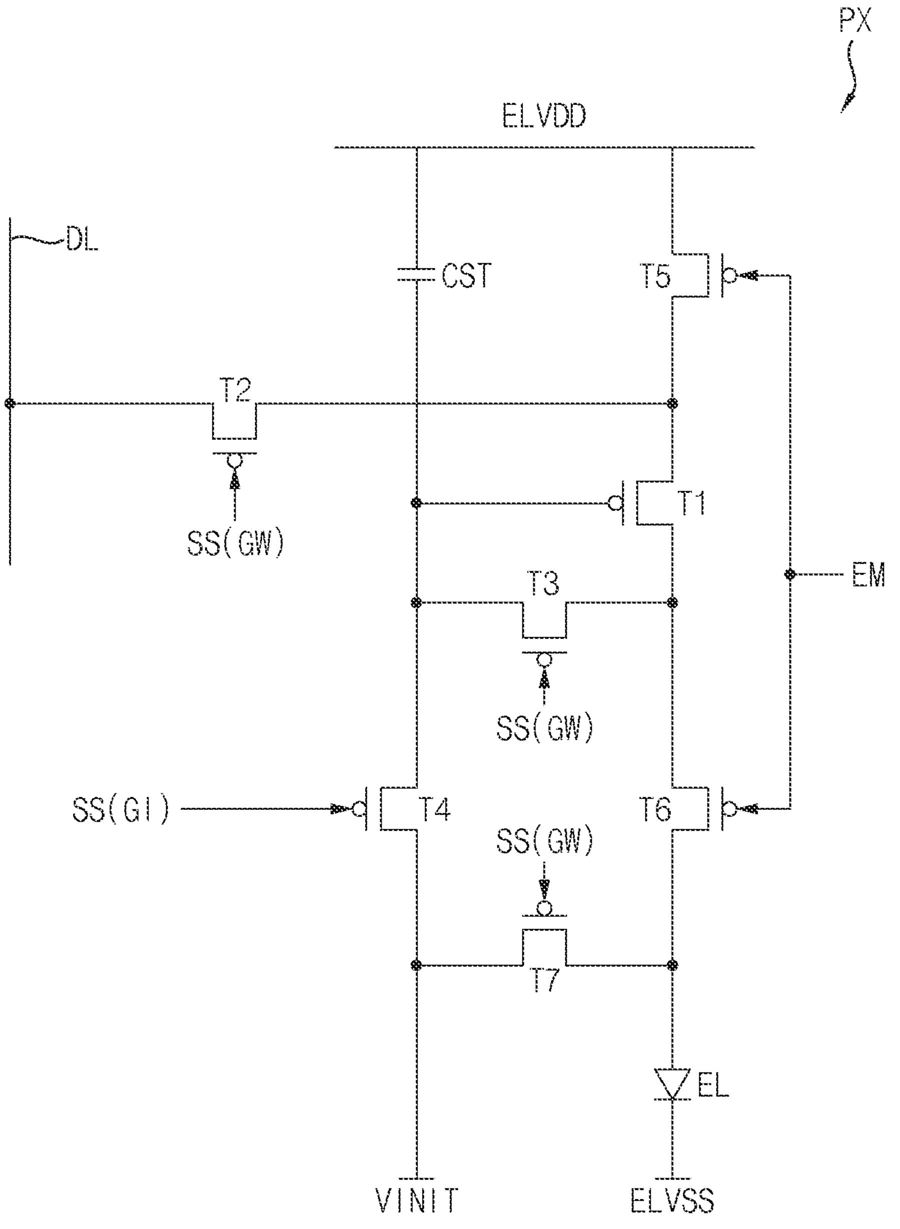

FIG. 2 is a circuit diagram illustrating an example of a pixel included in a display device according to embodiments.

Figure 3:
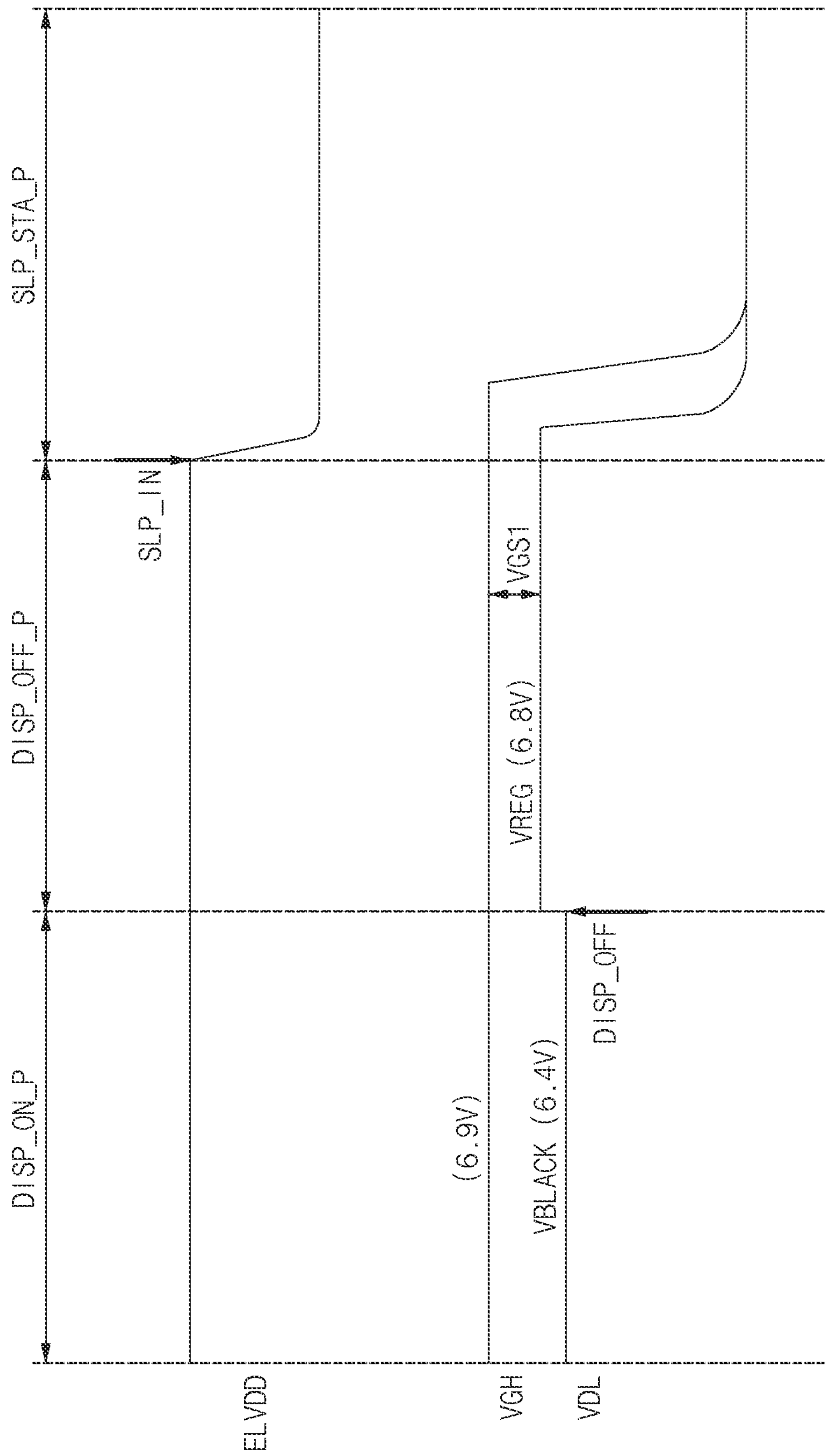

FIG. 3 is a timing diagram illustrating an example of voltages in a display-off period in a display device in which a gamma voltage and a gate-off voltage are not adjusted.

Figure 4A:
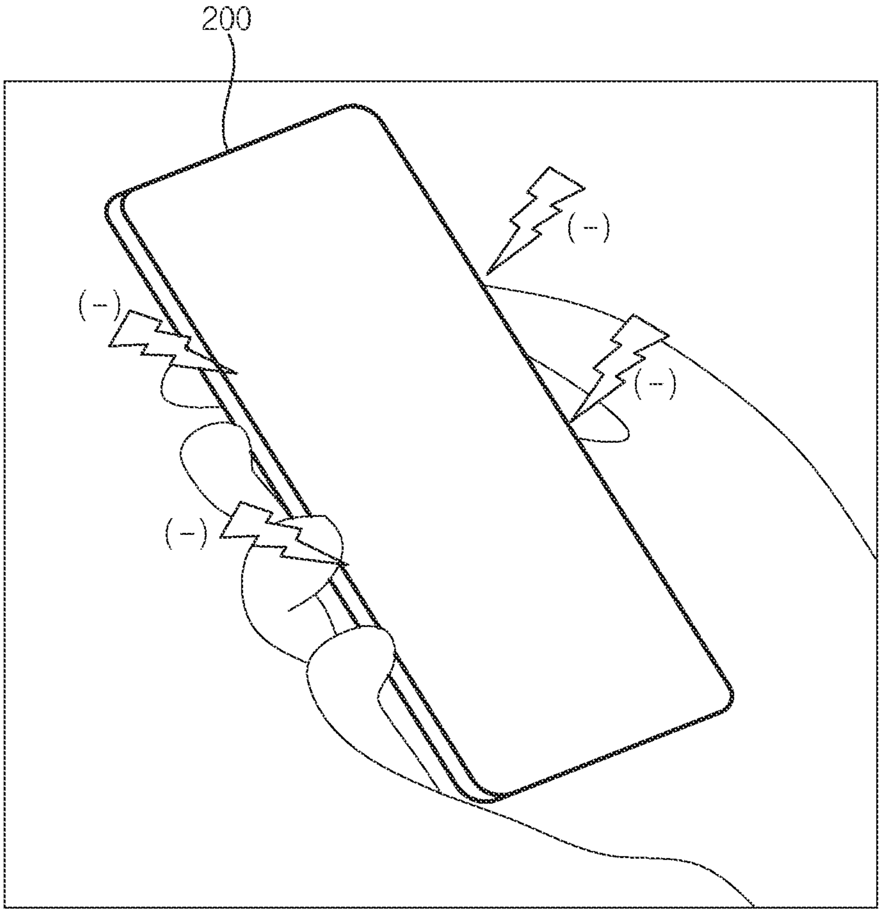
Figure 4B:
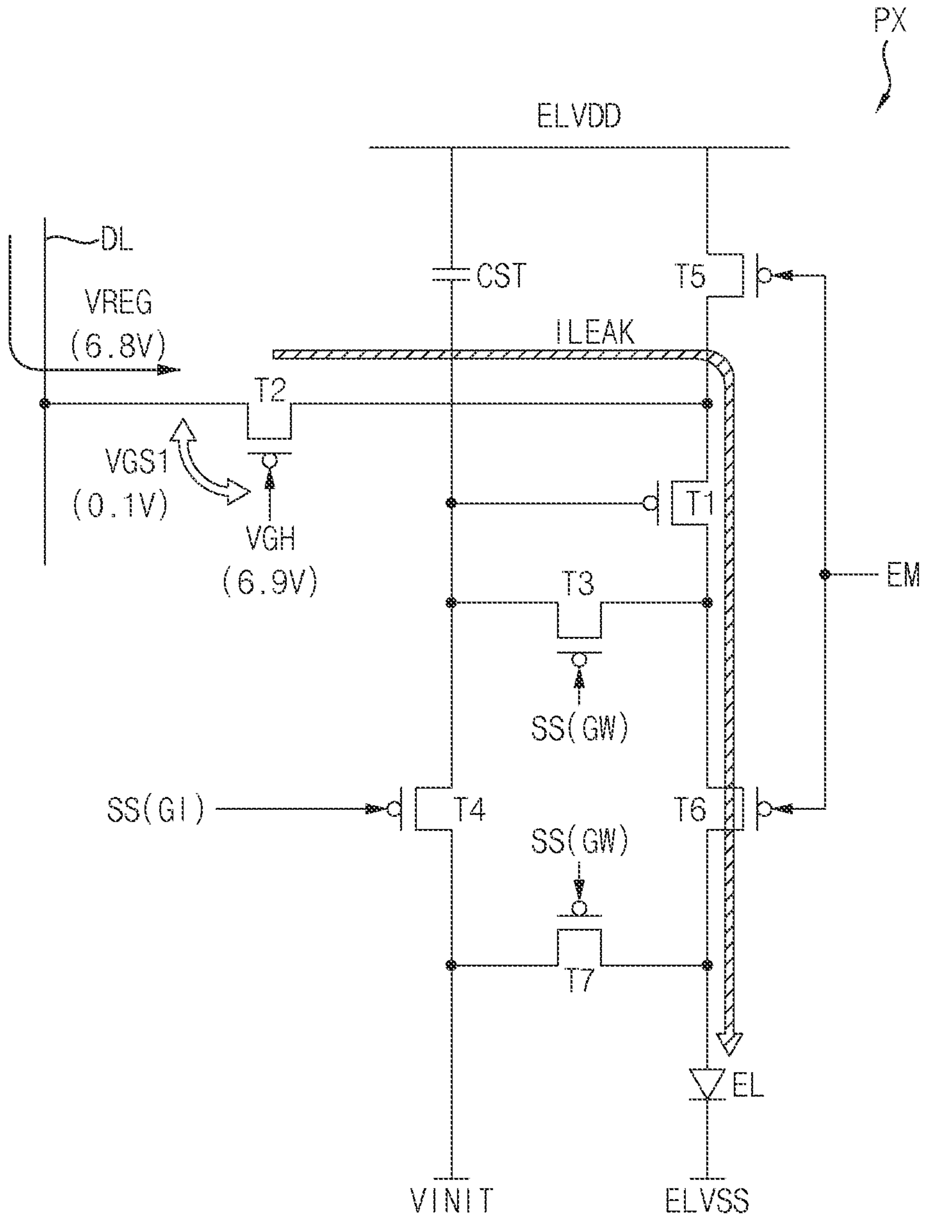
Figure 4C:
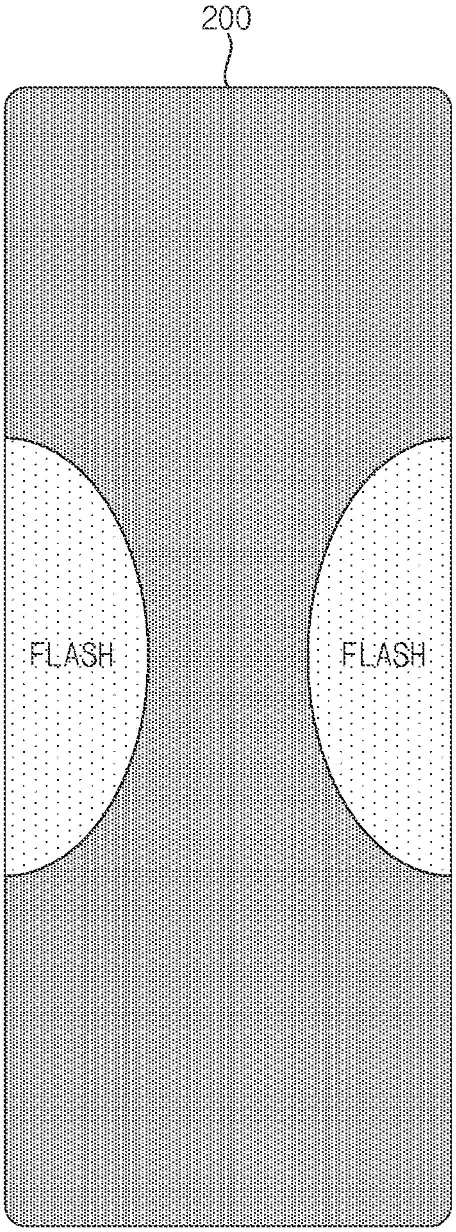

FIGS. 4A through 4C are diagrams for describing an example of flashing caused by static electricity in a display-off period in a display device in which a gamma voltage and a gate-off voltage are not adjusted.

Figure 5:
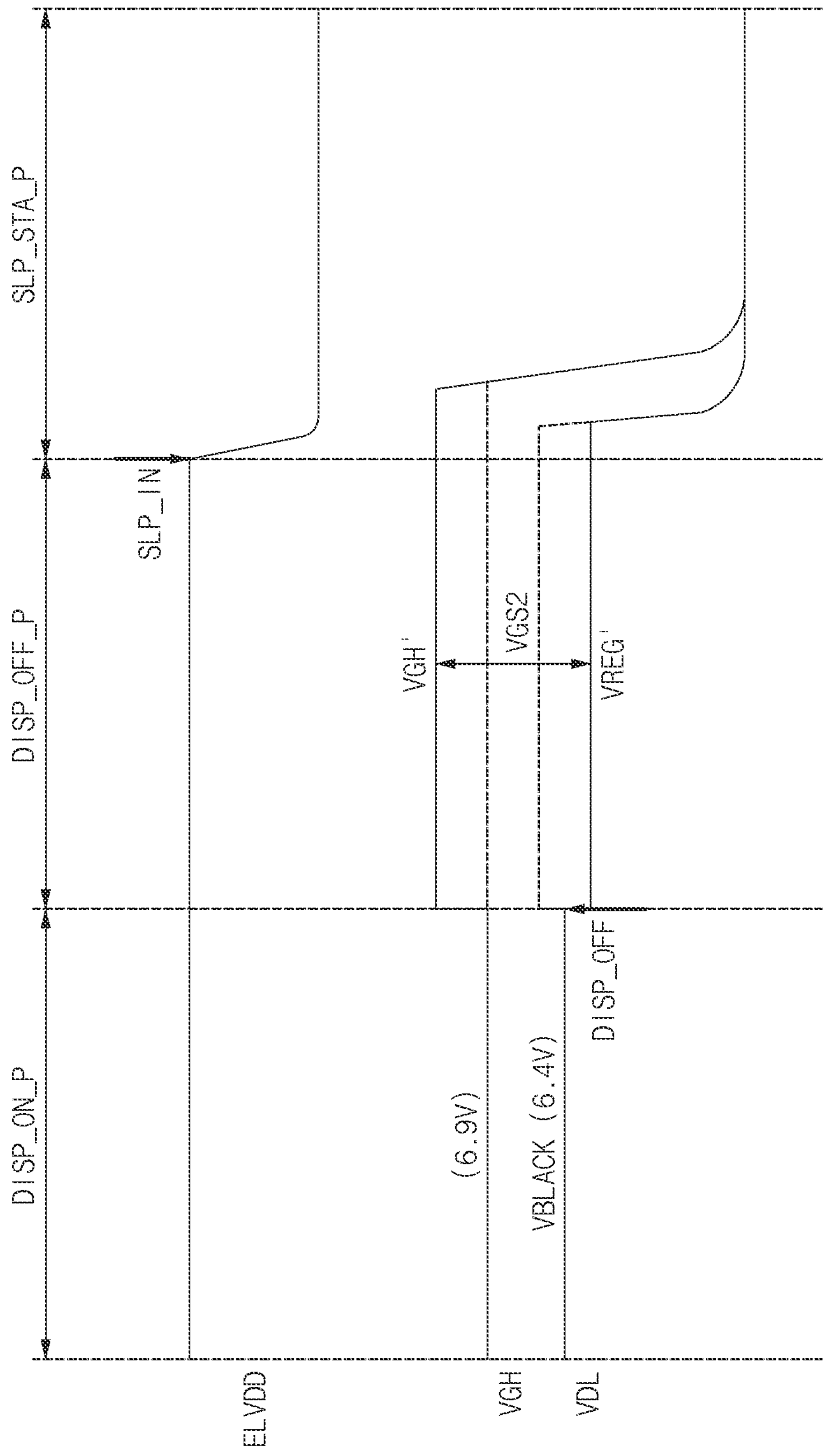

FIG. 5 is a timing diagram illustrating an example of voltages in a display-off period in a display device according to embodiments.

Figure 6:
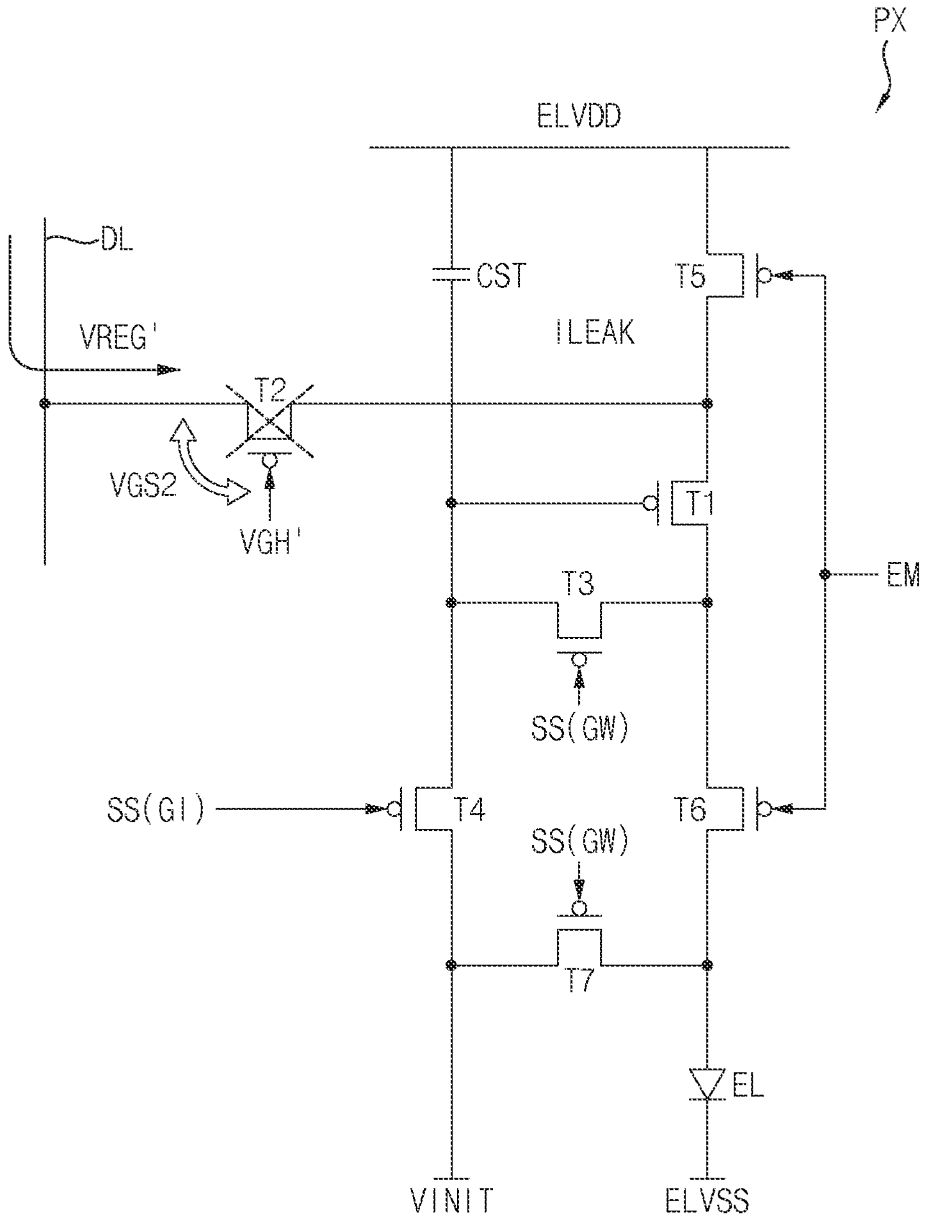

FIG. 6 is a circuit diagram for describing an example of a gate-source voltage of a second transistor in each pixel in a display-off period in a display device according to embodiments.

Figure 7:
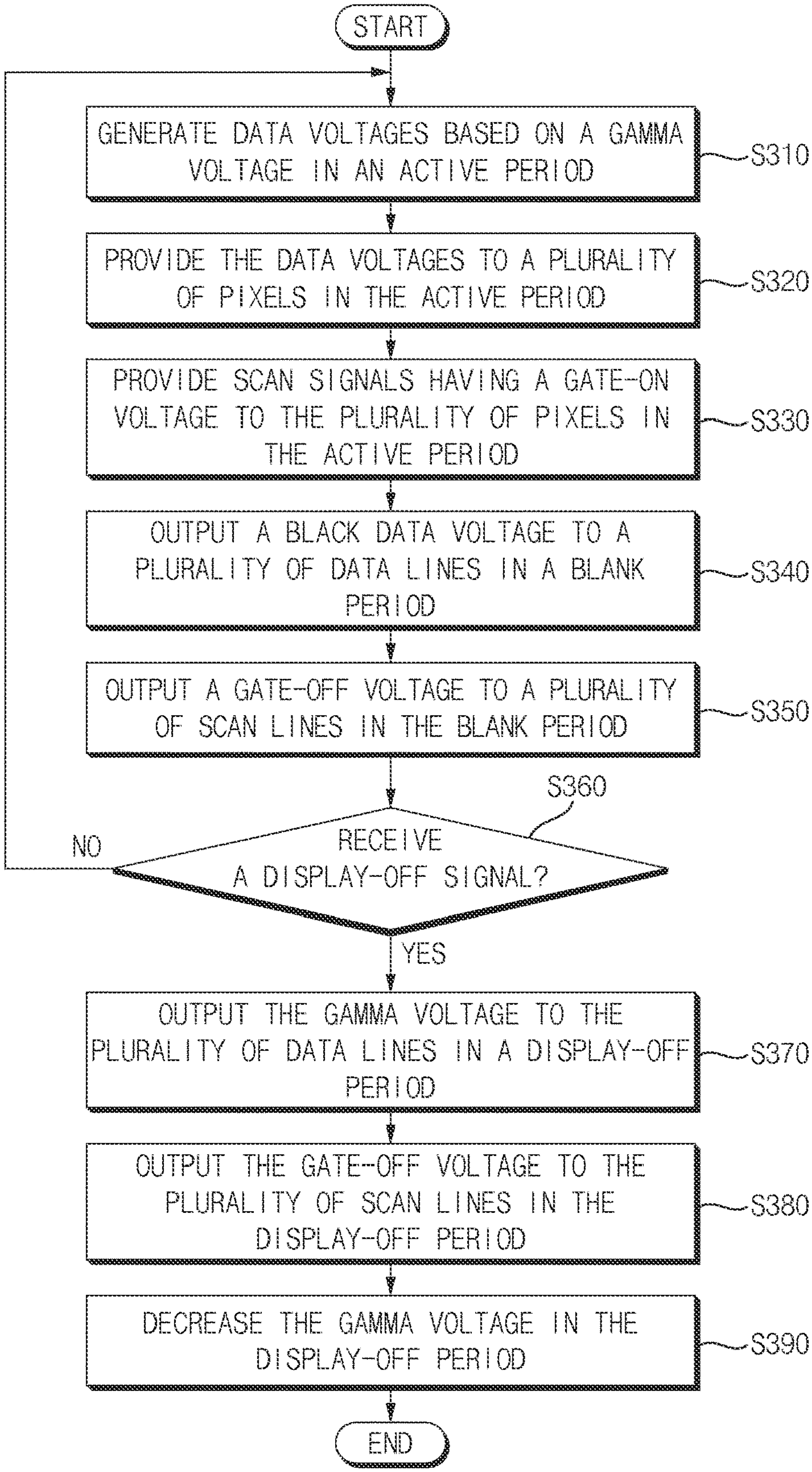

FIG. 7 is a flowchart illustrating a method of operating a display device according to embodiments.

FIGS. 8A through 8D are diagrams for describing examples of a display-off period.

Figure 9:
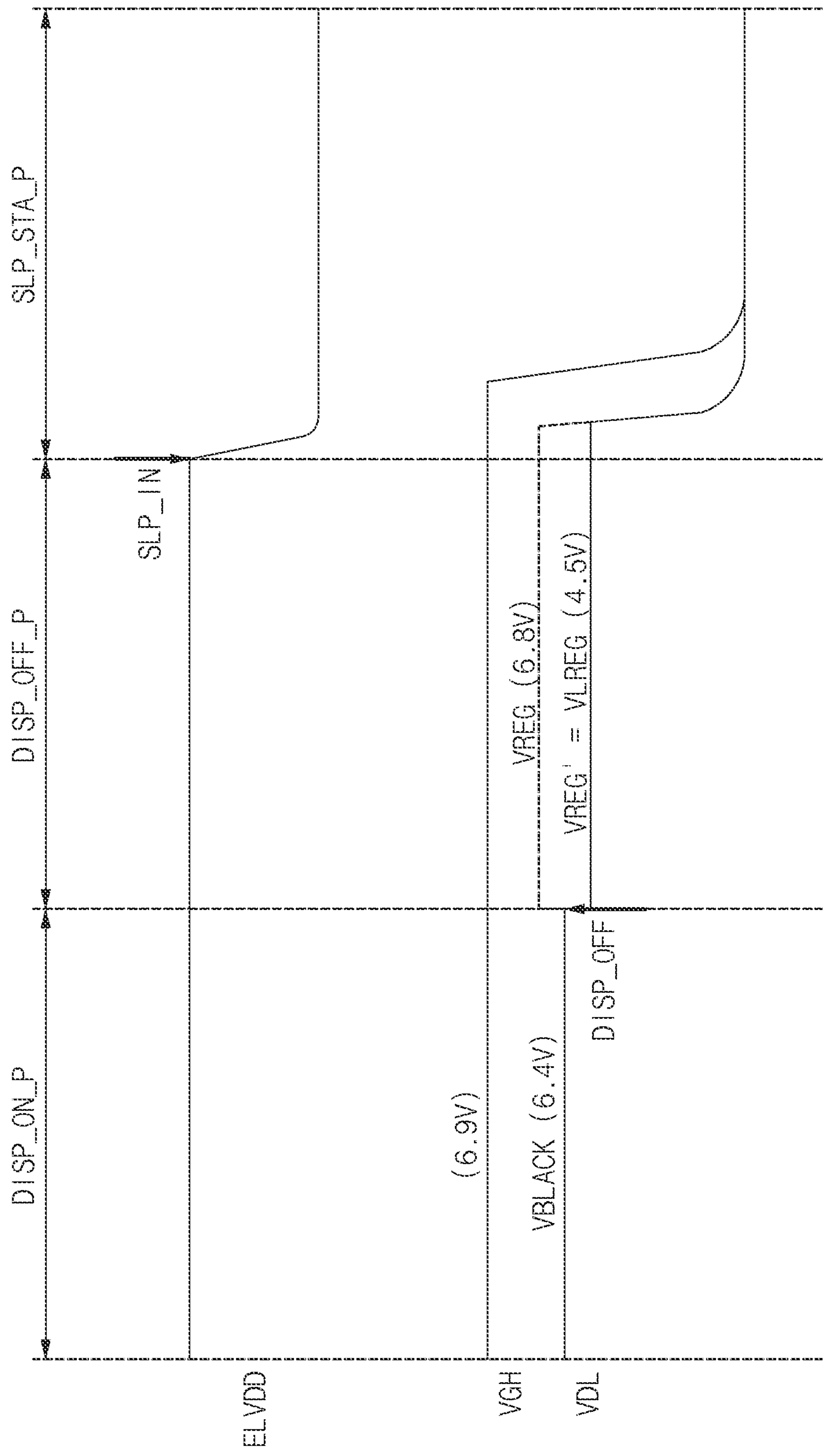

FIG. 9 is a timing diagram for describing an example where a gamma voltage is decreased in a display-off period.

Figure 10A:
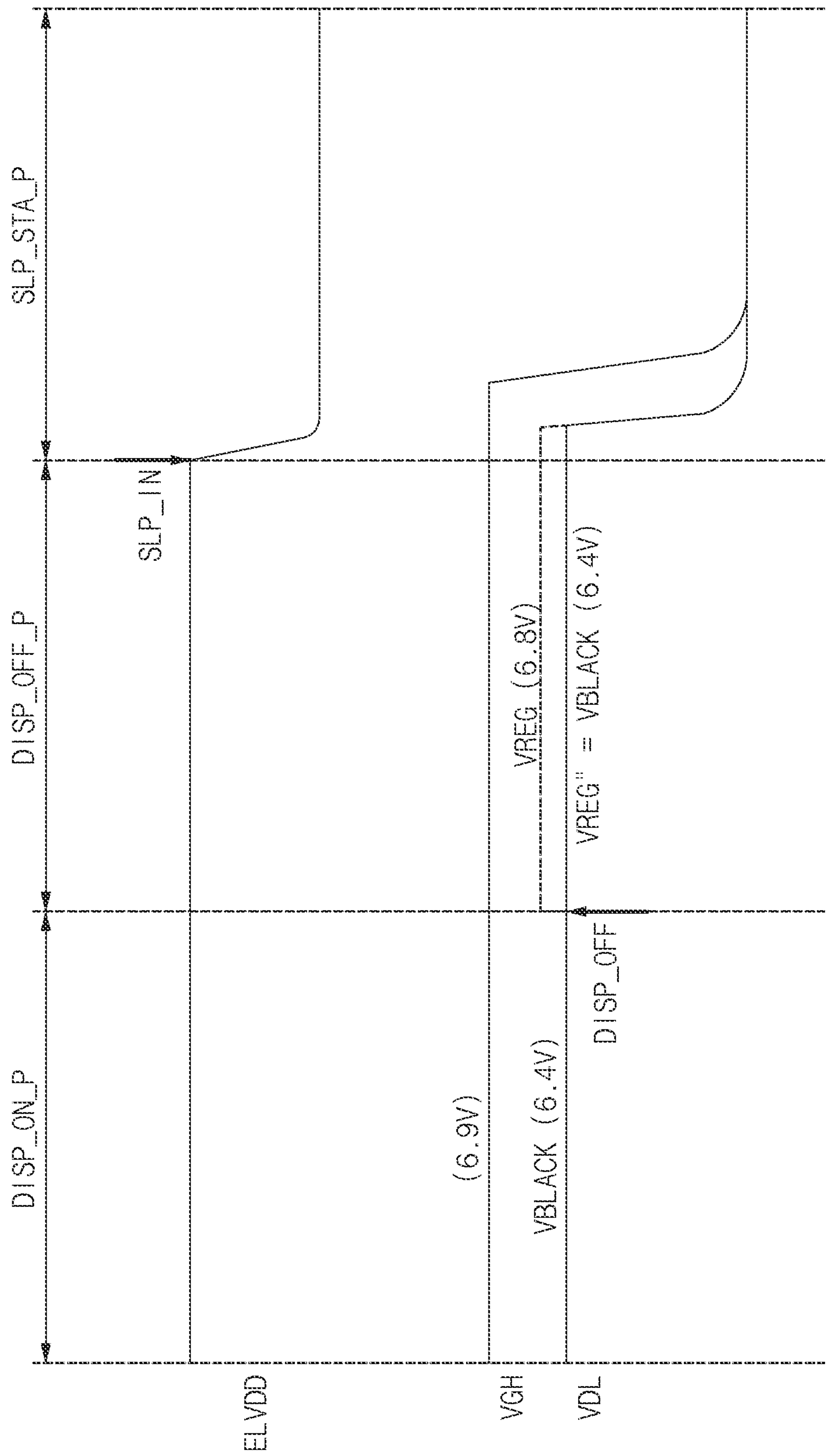

FIG. 10A is a timing diagram for describing an example where a gamma voltage is decreased in a display-off period, and FIG. 10B is a timing diagram for describing examples where a gamma voltage is decreased to different voltage levels with respect to different display devices in a display-off period.

Figure 11:
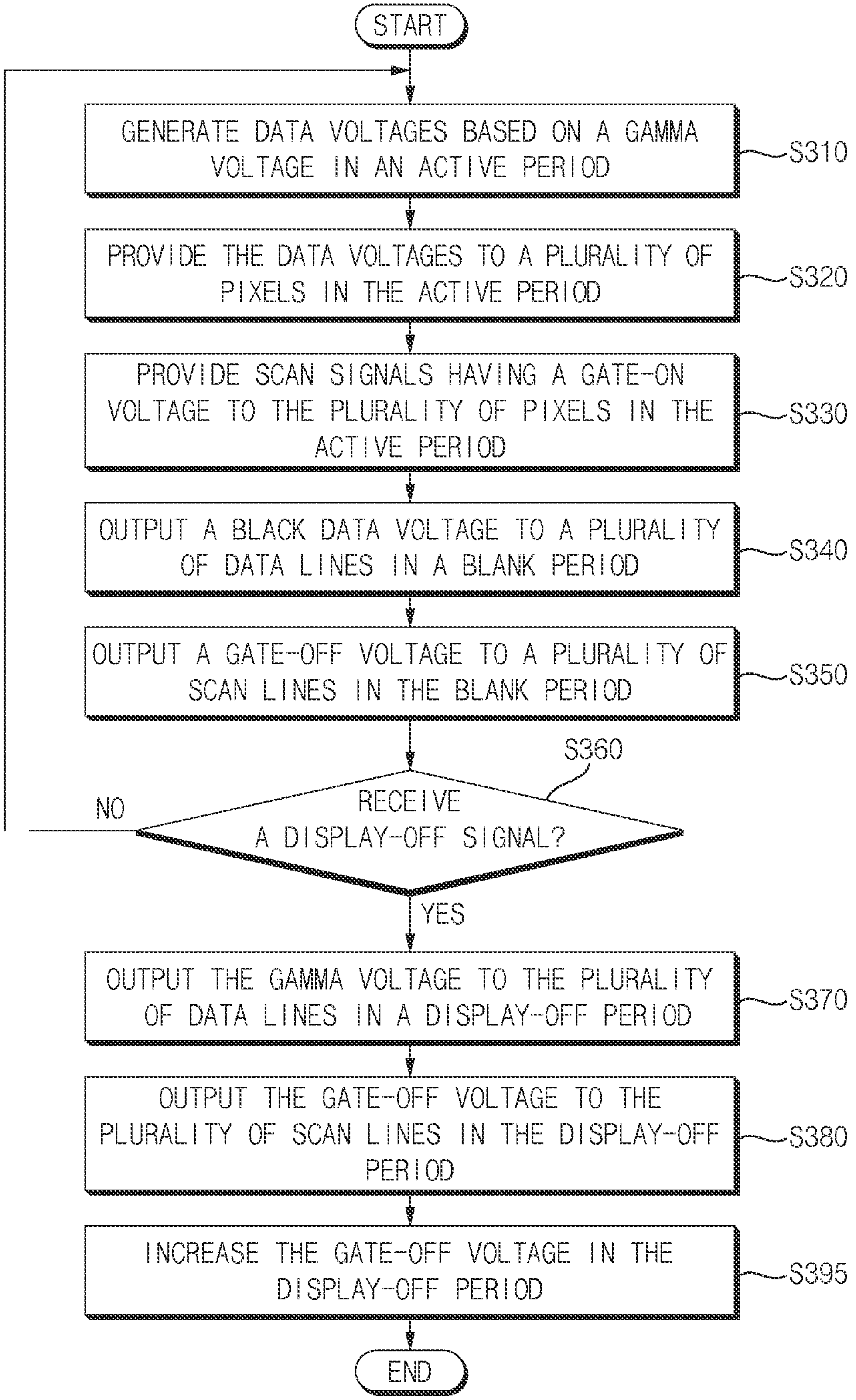

FIG. 11 is a flowchart illustrating a method of operating a display device according to embodiments.

Figure 12:
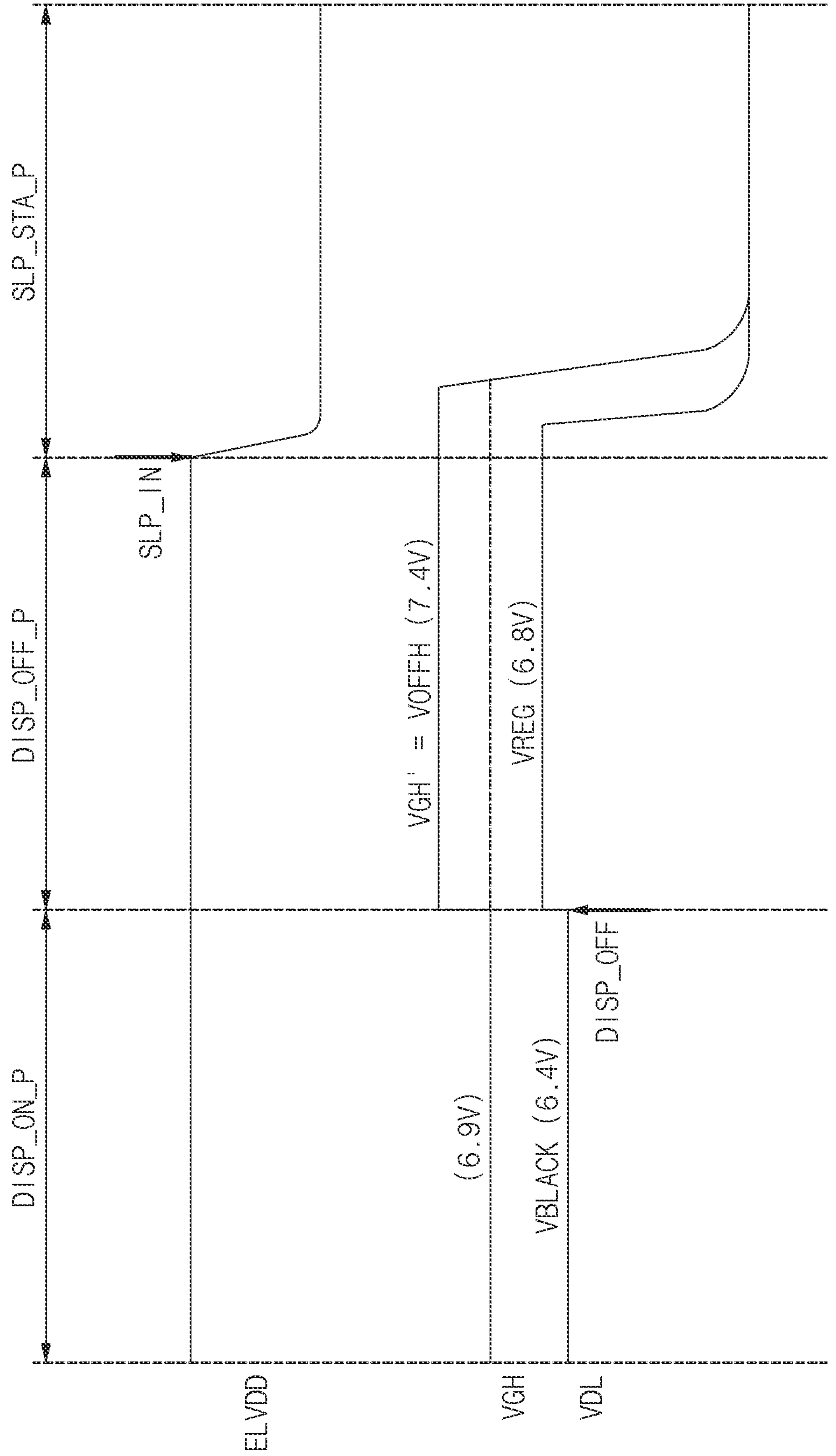

FIG. 12 is a timing diagram for describing an example where a gate-off voltage is increased in a display-off period.

Figure 13:
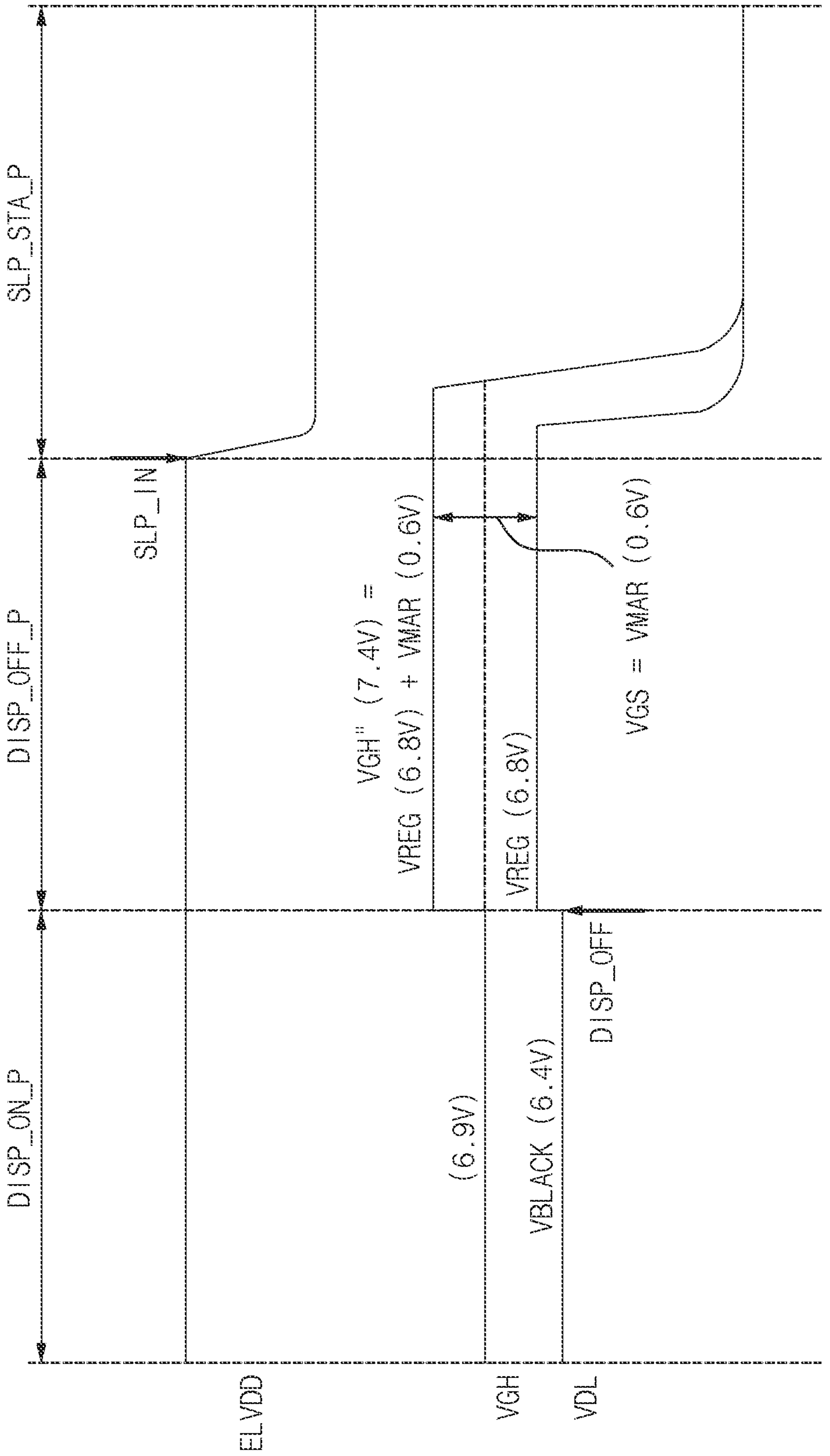

FIG. 13 is a timing diagram for describing an example where a gate-off voltage is increased in a display-off period.

Figure 14:
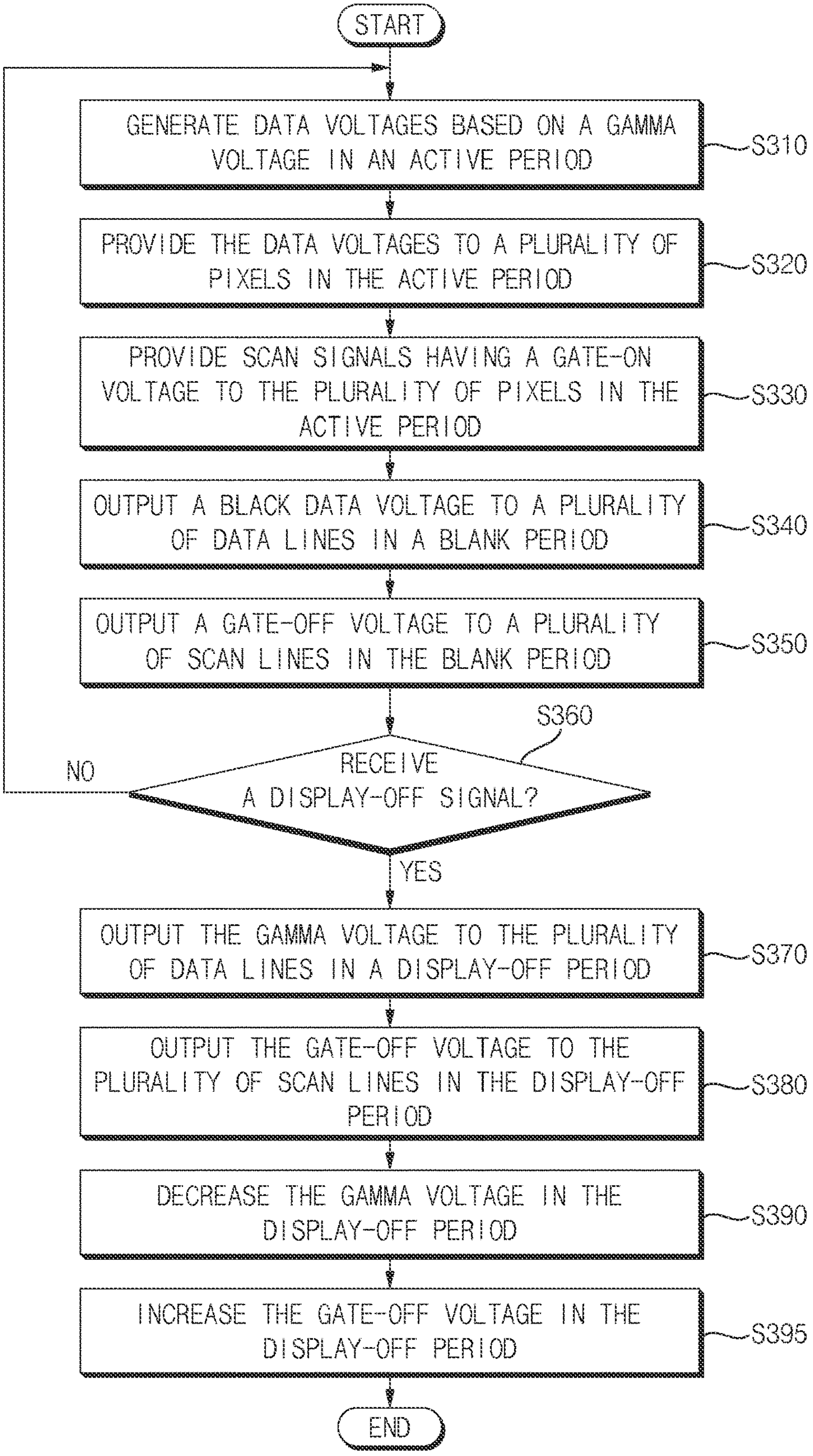

FIG. 14 is a flowchart illustrating a method of operating a display device according to embodiments.

Figure 15A:
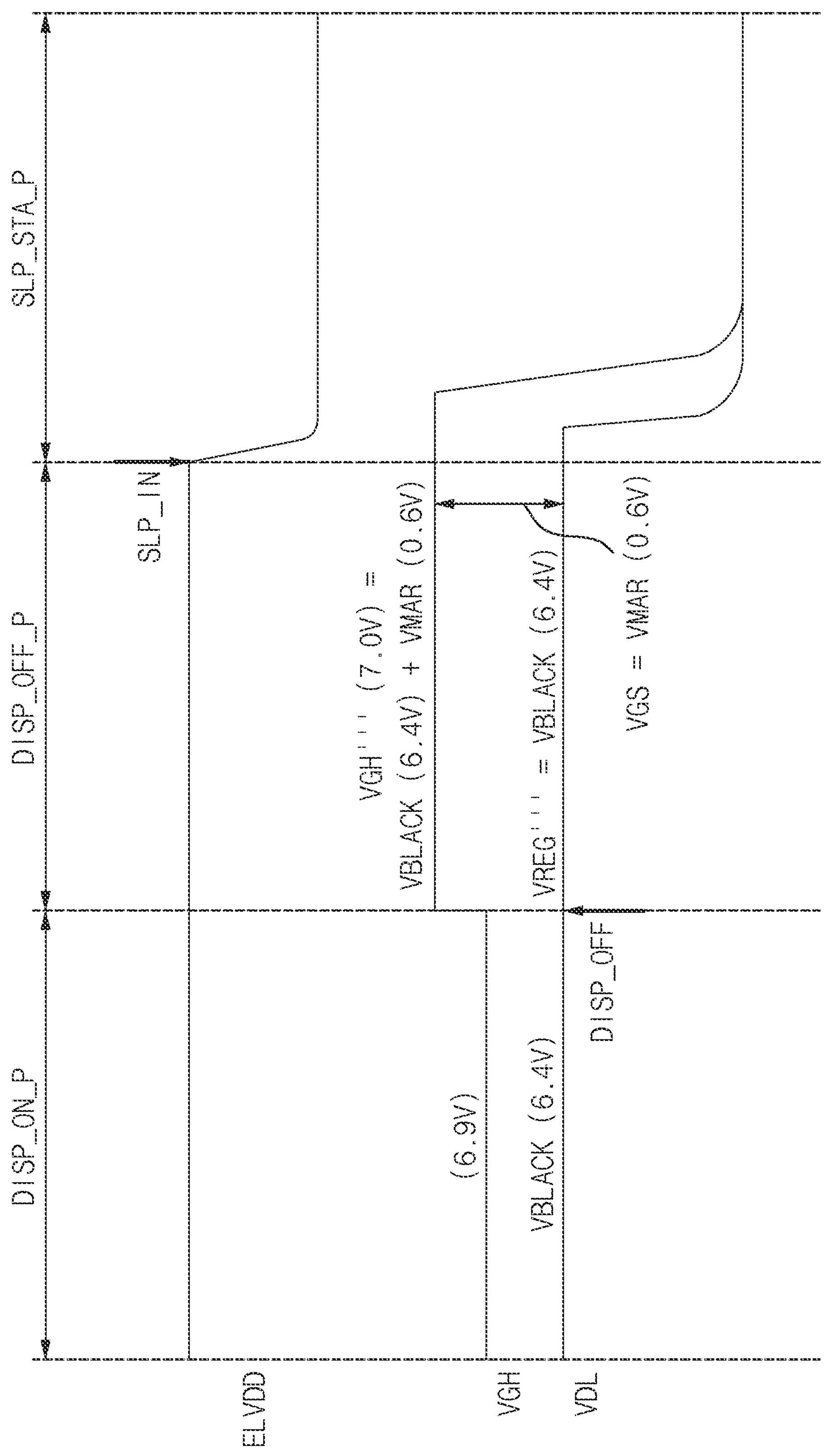

FIG. 15A is a timing diagram for describing an example where a gamma voltage is decreased and a gate-off voltage is increased in a display-off period, and FIG. 15B is a timing diagram for describing examples where each of a gamma voltage and a gate-off voltage is adjusted to different voltage levels with respect to different display devices in a display-off period.

FIG. 16 is a timing diagram for describing an example where each of a gamma voltage and a gate-off voltage is adjusted to different voltage levels with respect to different dimming levels in a display-off period.

Figure 17:
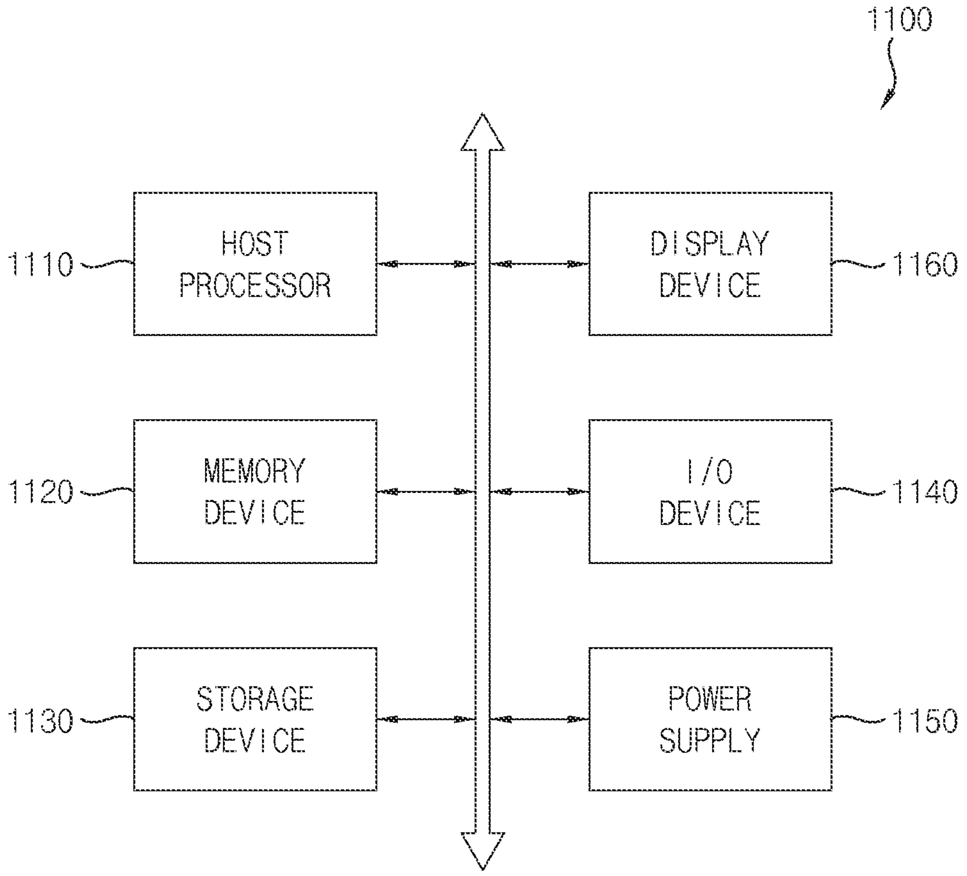

FIG. 17 is a block diagram illustrating an electronic device including a display device according to embodiments.

DETAILED DESCRIPTION OF THE EMBODIMENTS

Embodiments of the inventive concept will be described more fully hereinafter with reference to the accompanying drawings. Like reference numerals may refer to like elements throughout the accompanying drawings.

FIG. 1 is a block diagram illustrating a display device according to embodiments. FIG. 2 is a circuit diagram illustrating an example of a pixel included in a display device according to embodiments. FIG. 3 is a timing diagram illustrating an example of voltages in a display-off period in a display device in which a gamma voltage and a gate-off voltage are not adjusted. FIGS. 4A through 4C are diagrams for describing an example of flashing caused by static electricity in a display-off period in a display device in which a gamma voltage and a gate-off voltage are not adjusted. FIG. 5 is a timing diagram illustrating an example of voltages in a display-off period in a display device according to embodiments. FIG. 6 is a circuit diagram for describing an example of a gate-source voltage of a second transistor in each pixel in a display-off period in a display device according to embodiments.

Referring to FIG. 1, a display device 100 according to embodiments may include a display panel 110 that includes a plurality of pixels PX, and a panel driver 120 that drives the display panel 110. In some embodiments, the panel driver 120 may include a data driver 130 that provides data voltages VDAT to the plurality of pixels PX, a scan driver 140 that provides scan signals SS to the plurality of pixels PX, an emission driver 150 that provides emission signals EM to the plurality of pixels PX, a power management circuit 160 that generates voltages AVDD utilized for an operation of the display device 100, and a controller 170 that controls the operation of the display device 100.

The display panel 110 may include a plurality of data lines, a plurality of scan lines, a plurality of emission lines, and the plurality of pixels PX connected thereto. In some embodiments, as illustrated in FIG. 2, each pixel PX may include a storage capacitor CST, first, second, third, fourth, fifth, sixth and seventh transistors T1, T2, T3, T4, T5, T6 and T7, and a light emitting element EL.

The storage capacitor CST may store the data voltage VDAT that is transferred through the second transistor T2 and the (diode-connected) first transistor T1. In some embodiments, the storage capacitor CST may include a first electrode connected to a line that transfers a first power supply voltage ELVDD (e.g., a high power supply voltage), and a second electrode connected to a gate of the first transistor T1.

The first transistor T1 may generate a driving current based on the data voltage VDAT stored in the storage capacitor CST. In some embodiments, the first transistor T1 may include a gate connected to the storage capacitor CST, a first terminal connected to the second and fifth transistors T2 and T5, and a second terminal connected to the third and sixth transistors T3 and T6.

The second transistor T2 may transfer the data voltage VDAT of the data line DL to the first terminal of the first transistor T1 in response to the scan signal SS (or a write signal GW). In some embodiments, the second transistor T2 may include a gate that receives the scan signal SS (or the write signal GW), a first terminal (e.g., a source) connected to the data line DL, and a second terminal connected to the first terminal of the first transistor T1.

The third transistor T3 may diode-connect the first transistor T1 in response to the scan signal SS (or the write signal GW). In some embodiments, the third transistor T3 may include a gate that receives the scan signal SS (or the write signal GW), a first terminal connected to the second terminal of the first transistor T1, and a second terminal connected to the gate of the first transistor T1.

The fourth transistor T4 may apply an initialization voltage VINIT to the storage capacitor CST and the gate of the first transistor T1 in response to the scan signal SS (or an initialization signal GI). In some embodiments, the fourth transistor T4 may include a gate that receives the scan signal SS (or the initialization signal GI), a first terminal connected to the storage capacitor CST and the gate of the first transistor T1, and a second terminal connected to a line that transfers the initialization voltage VINIT.

The fifth and sixth transistors T5 and T6 may form a path of the driving current from the line that transfers the first power supply voltage ELVDD and a line that transfers a second power supply voltage ELVSS (e.g., a low power supply voltage) in response to the emission signal EM. In some embodiments, the fifth transistor T5 may include a gate that receives the emission signal EM, a first terminal connected to the line that transfers the first power supply voltage ELVDD, and a second terminal connected to the first terminal of the first transistor T1, and the sixth transistor T6 may include a gate that receives the emission signal EM, a first terminal connected to the second terminal of the first transistor T1, and a second terminal connected to an anode of the light emitting element EL.

The seventh transistor T7 may apply the initialization voltage VINIT to the anode of the light emitting element EL in response to the scan signal SS (or the write signal GW). In some embodiments, the seventh transistor T7 may include a gate that receives the scan signal SS (or the write signal GW), a first terminal connected to the anode of the light emitting element EL, and a second terminal connected to the line that transfers the initialization voltage VINIT.

The light emitting element EL may emit light based on the driving current generated by the first transistor T1. In some embodiments, the light emitting element EL may be an organic light emitting diode (OLED), but is not limited thereto. In some embodiments, the light emitting element EL may be any suitable light emitting element. For example, the light emitting element EL may be a micro light emitting diode, a nano light emitting diode (NED), a quantum dot (QD) light emitting diode, an inorganic light emitting diode, or any other suitable light emitting element. In some embodiments, the light emitting element EL may include an anode connected to the sixth and seventh transistors T6 and T7, and a cathode connected to the line that transfers the second power supply voltage ELVSS.

Although FIG. 2 illustrates an example where the scan signals SS applied to the second, third and seventh transistors T2, T3 and T7 are the same write signal GW, in some embodiments, the scan signals SS applied to the second, third and seventh transistors T2, T3 and T7 may be different signals. In some embodiments, as illustrated in FIG. 2, the first through seventh transistors T1 through T7 may be implemented as p-type metal oxide semiconductor (PMOS) transistors, but are not limited thereto. In some embodiments, at least one of the first through seventh transistors T1 through T7 may be implemented as an n-type metal oxide semiconductor (NMOS) transistor. Further, although FIG. 2 illustrates an example where each pixel PX has a 7TIC structure including seven transistors T1 through T7 and one capacitor CST, a structure of the pixel PX of the display device 100 according to embodiments is not limited to the 7T1C structure illustrated in FIG. 2.

The data driver 130 may generate the data voltages VDAT based on output image data ODAT, a data control signal DCTRL and a gamma voltage VREG, and may provide the data voltages VDAT to the plurality of pixels PX. In some embodiments, the data control signal DCTRL may include, but is not limited to, an output data enable signal, a horizontal start signal and a load signal. The data driver 130 may generate the data voltages VDAT based on the gamma voltage VREG. In some embodiments, the data driver 130 may generate the data voltages VDAT respectively corresponding to a plurality of gray levels by dividing the gamma voltage VREG, and may provide the plurality of pixels PX with the data voltages VDAT corresponding to gray levels indicated by the output image data ODAT. Further, the data driver 130 may provide the plurality of pixels PX with the data voltages VDAT that are generated based on the gamma voltage VREG through the plurality of data lines in an active period of each frame period of a display-on period, may output a black data voltage VBLACK to the plurality of data lines in a blank period (e.g., a vertical blank period or a porch period) of each frame period of the display-on period, and may output the gamma voltage VREG in a display-off period. Here, the black data voltage VBLACK may mean the data voltage VDAT for the lowest gray level (e.g., a 0-gray level), or the highest data voltage. In some embodiments, the data driver 130 and the controller 170 may be implemented as a single integrated circuit, and the single integrated circuit may be referred to as a timing controller embedded data driver (TED) integrated circuit. In some embodiments, the data driver 130 and the controller 170 may be implemented as separate integrated circuits.

In some embodiments, the data driver 130 may include a voltage converting block VCB that receives an analog driving voltage AVDD from the power management circuit 160 and that generates the gamma voltage VREG, a gate-off voltage VGH and a gate-on voltage VGL based on the analog driving voltage AVDD. The voltage converting block VCB may convert the analog driving voltage AVDD into the gamma voltage VREG, the gate-off voltage VGH and the gate-on voltage VGL. The data driver 130 may generate the data voltages VDAT based on the gamma voltage VREG, and may provide the gate-off voltage VGH and the gate-on voltage VGL to the scan driver 140. Although FIG. 1 illustrates an example where the voltage converting block VCB is included in the data driver 130, the location of the voltage converting block VCB is not limited the example of FIG. 1. In some embodiments, the voltage converting block VCB may be included in the power management circuit 160 or the controller 170.

The scan driver 140 may generate the scan signals SS having the gate-on voltage VGL based on a scan control signal SCTRL received from the controller 170. In some embodiments, the scan control signal SCTRL may include a scan start signal and a scan clock signal, but is not limited thereto. Further, in the active period of each frame period of the display-on period, the scan driver 140 may sequentially provide the scan signals SS to the plurality of pixels PX on a row-by-row basis. In some embodiments, the scan signal SS applied to each pixel PX may include, but is not limited to, the write signal GW and the initialization signal GI illustrated in FIG. 2. Further, in the blank period of each frame period of the display-on period and in the display-off period, the scan driver 140 may output the gate-off voltage VGH as the scan signals SS to the plurality of scan lines. In some embodiments, the scan driver 140 may be integrated or formed in the display panel 110. In some embodiments, the scan driver 140 may be implemented as one or more integrated circuits.

The emission driver 150 may generate the emission signals EM based on an emission control signal EMCTRL received from the controller 170, and may sequentially provide the emission signals EM to the plurality of pixels PX on a row-by-row basis. In some embodiments, the emission control signal EMCTRL may include an emission start signal and an emission clock signal, but is not limited thereto. In some embodiments, the emission driver 150 may be integrated or formed in the display panel 110. In some embodiments, the emission driver 150 may be implemented as one or more integrated circuits.

The power management circuit 160 may generate voltages AVDD utilized for an operation of the display device 100 based on a power control signal PCTRL received from the controller 170. For example, the power management circuit 160 may generate the analog driving voltage AVDD provided to the data driver 130, and may further generate the first power supply voltage ELVDD, the second power supply voltage ELVSS and the initialization voltage VINIT provided to the display panel 110. In some embodiments, the power management circuit 160 may be implemented as an integrated circuit, and this integrated circuit may be referred to as a power management integrated circuit (PMIC). In some embodiments, the power management circuit 160 may be included in the data driver 130 or the controller 170.

The controller 170 (e.g., a timing controller (TCON)) may receive input image data IDAT and a control signal CTRL from an external host processor (e.g., a graphics processing unit (GPU), an application processor (AP) or a graphics card). In some embodiments, the controller 170 may receive a command CMD (or a user command) instead of the input image data IDAT in the blank period of the frame period. Further, as illustrated in FIG. 1, the control signal CTRL may include a display-on signal DISP_ON indicating the display-on period, a display-off signal DISP_OFF indicating the display-off period, a sleep-in signal SLP_IN indicating a start of a sleep state period, a sleep-out signal SLP_OUT indicating an end of the sleep state period, a power-on signal PWR_ON indicating a power-on of the display device 100, and a power-off signal PWR_OFF indicating a power-off of the display device 100. In some embodiments, the control signal CTRL may further include a vertical synchronization signal, a horizontal synchronization signal, an input data enable signal, a master clock signal, etc., but is not limited thereto. The controller 170 may generate the output image data ODAT, the data control signal DCTRL, the scan control signal SCTRL, the emission control signal EMCTRL and the power control signal PCTRL based on the input image data IDAT and the control signal CTRL. The controller 170 may control an operation of the data driver 130 by providing the output image data ODAT and the data control signal DCTRL to the data driver 130, may control an operation of the scan driver 140 by providing the scan control signal SCTRL to the scan driver 140, may control an operation of the emission driver 150 by providing the emission control signal EMCTRL to the emission driver 150, and may control an operation of the power management circuit 160 by providing the power control signal PCTRL to the power management circuit 160.

As illustrated in FIG. 3, in the display-off period DISP_OFF_P between the display-on period DISP_ON_P and the sleep state period SLP_STA_P or between the display-on period DISP_ON_P and a power-off period, in a case where the gamma voltage VREG and the gate-off voltage VGH are not adjusted, a gate-source voltage VGS1 of the second transistor T2 of each pixel PX may be decreased. For example, when the display device 100 enters the display-off period DISP_OFF_P in response to the display-off signal DISP_OFF, the data driver 130 may output the gamma voltage VREG instead of the data voltage VDAT and the black data voltage VBLACK to the plurality of data lines. That is, in the display-off period DISP_OFF_P, a voltage VDL of the data line DL connected to the first terminal (e.g., the source) of the second transistor T2 may be increased from the black data voltage VBLACK (or the data voltage VDAT) to the gamma voltage VREG. Accordingly, the gate-source voltage VGS1 of the second transistor T2 in the display-off period DISP_OFF_P may be less than the gate-source voltage of the second transistor T2 in the display-on period DISP_ON_P. For example, in the display-on period DISP_ON_P, a voltage difference between the gate-off voltage VGH of about 6.9V applied to the gate of the second transistor T2 and the black data voltage VBLACK of about 6.4V applied to the first terminal of the second transistor T2 may be about 0.5V. However, in the display-off period DISP_OFF_P, a voltage difference between the gate-off voltage VGH of about 6.9V applied to the gate of the second transistor T2 and the gamma voltage VREG of about 6.8V applied to the first terminal of the second transistor T2 may be about 0.1V, which is less than the voltage difference of about 0.5V in the display-on period DISP_ON_P. For convenience of explanation, FIG. 3 illustrates an example of the voltage VDL of the data line DL when the display device 100 displays a black image or a black pattern. However, in the display-on period DISP_ON_P, the voltage VDL of the data line DL may be the data voltage VDAT in the active period of each frame period, and may be the black data voltage VBLACK in the blank period of each frame period.

Further, in the case where the gamma voltage VREG and the gate-off voltage VGH are not adjusted in the display-off period DISP_OFF_P, flashing of the display panel 110 may occur due to static electricity. For example, as illustrated in FIG. 4A, when a user grips the electronic device 200 including the display device 100, static electricity may be induced to the display panel 110. For example, static electricity may flow into a polyimide layer of the display panel 110. Due to this static electricity, a threshold voltage of each of the first through seventh transistors T1 through T7 of each pixel PX may be shifted (e.g., positively shifted), and a leakage current may occur. For example, as illustrated in FIG. 4B, in the display-off period DISP_OFF_P, if the threshold voltage of the second transistor T2 is shifted due to static electricity, and the gate-source voltage VGS1 of the second transistor T2 is decreased to the voltage difference of about 0.1V between the gate-off voltage VGH of about 6.9V and the gamma voltage VREG of about 6.8V, the leakage current ILEAK through the second transistor T2 may occur. The leakage current ILEAK through the second transistor T2 may be provided to the light emitting element EL through the first transistor T1 and the sixth transistor T6, and the light emitting element EL may emit light based on the leakage current ILEAK. In this case, as illustrated in FIG. 4C, flashing of the display panel 110 of the electronic device 200 may occur. For example, a green light emitting element may have higher luminous efficiency than those of red and blue light emitting elements, and, thus greenish flashing may occur in the electronic device 200.

To prevent flashing of the display panel 110 in the display-off period DISP_OFF_P, in the display device 100 according to embodiments, the panel driver 120 may adjust at least one of the gamma voltage VREG and the gate-off voltage VGH in the display-off period DISP_OFF_P. In some embodiments, in the display-off period DISP_OFF_P, the panel driver 120 may decrease the gamma voltage VREG such that a difference between the gate-off voltage VGH and the gamma voltage VREG becomes greater than or equal to a predetermined voltage margin. For example, the predetermined voltage margin may be about 0.5V or about 0.6V, but is not limited thereto. In some embodiments, in the display-off period DISP_OFF_P, the panel driver 120 may increase the gate-off voltage VGH such that the difference between the gate-off voltage VGH and the gamma voltage VREG becomes greater than or equal to the predetermined voltage margin. In some embodiments, in the display-off period DISP_OFF_P, the panel driver 120 may decrease the gamma voltage VREG and may increase the gate-off voltage VGH such that the difference between the gate-off voltage VGH and the gamma voltage VREG becomes greater than or equal to the predetermined voltage margin.

For example, as illustrated in FIG. 5, in the display-off period DISP_OFF_P, the panel driver 120 may generate the gamma voltage VREG' lower than the gamma voltage VREG in the display-on period DISP_ON_P by decreasing the gamma voltage VREG, and may output the decreased gamma voltage VREG' to the plurality of data lines. Further, the panel driver 120 may generate the gate-off voltage VGH' higher than the gate-off voltage VGH in the display-on period DISP_ON_P by increasing the gate-off voltage VGH, and may output the increased gate-off voltage VGH' to the plurality of scan lines. Accordingly, as illustrated in FIG. 6, a voltage difference between the gate-off voltage VGH' applied to the gate of the second transistor T2 and the gamma voltage VREG' applied to the first terminal (e.g., the source) of the second transistor T2, or the gate-source voltage VGS2 of the second transistor T2 of each pixel PX may be greater than or equal to the predetermined voltage margin, the second transistor T2 may be turned off (e.g., completely turned off), and the leakage current ILEAK through the second transistor T2 does not occur in some embodiments. Accordingly, in some embodiments, even if the threshold voltage of the second transistor T2 is shifted due to static electricity of the display panel 110, in the display-off period DISP_OFF_P, the leakage current ILEAK through the second transistor T2 does not occur, and flashing of the display panel 110 may be prevented.

Further, in some embodiments, this operation of adjusting at least one of the gamma voltage VREG and the gate-off voltage VGH may be selectively performed in response to the command CMD (e.g., a user command) received from the external host processor. That is, the command CMD may enable or disable the operation.

As described above, in the display device 100 according to embodiments, in the display-off period DISP_OFF_P, at least one of the gamma voltage VREG applied to the data line and the gate-off voltage VGH applied to the scan line may be adjusted. Accordingly, in the display-off period DISP_OFF_P, the leakage current ILEAK in each pixel PX may be prevented, and flashing of the display panel 110 may be prevented.

FIG. 7 is a flowchart illustrating a method of operating a display device according to embodiments. FIGS. 8A through 8D are diagrams for describing examples of a display-off period. FIG. 9 is a timing diagram for describing an example where a gamma voltage is decreased in a display-off period. FIG. 10A is a timing diagram for describing an example where a gamma voltage is decreased in a display-off period, and FIG. 10B is a timing diagram for describing examples where a gamma voltage is decreased to different voltage levels with respect to different display devices in a display-off period.

Referring to FIGS. 1 and 7, in an active period of each frame period of a display-on period DISP_ON_P, a panel driver 120 may generate data voltages VDAT based on a gamma voltage VREG (S310), and may provide the data voltages VDAT and scan signals SS having a gate-on voltage VGL to a plurality of pixels PX of a display panel 110 (S320 and S330). For example, the data driver 130 may generate the data voltages VDAT by dividing the gamma voltage VREG respectively corresponding to a plurality of gray levels (S310), and may provide the plurality of pixels PX with the data voltages VDAT corresponding to gray levels indicated by output image data ODAT through a plurality of data lines (S320). Further, a scan driver 140 may sequentially provide the scan signals SS having the gate-on voltage VGL to the plurality of pixels PX on a row-by-row basis through a plurality of scan lines (S330). The plurality of pixels PX may receive the data voltages VDAT in response to the scan signals SS, and may display an image based on the data voltages VDAT.

In a blank period (e.g., a vertical blank period or a porch period) of each frame period of the display-on period DISP_ON_P, the panel driver 120 may output a black data voltage VBLACK to the plurality of data lines (S340), and may output a gate-off voltage VGH as the scan signals SS to the plurality of scan lines (S350). For example, the black data voltage VBLACK may be the data voltage VDAT for the lowest gray level (e.g., 0-gray level), or the highest data voltage, and the gate-off voltage VGH may be a high gate voltage.

If the panel driver 120 does not receive a display-off signal DISP_OFF (S360: NO), the panel driver 120 may repeat the above-described operations (S310 through S350). When the panel driver 120 receives the display-off signal DISP_OFF (S360: YES), the display device 100 may enter a display-off period DISP_OFF_P. Here, the display-off period DISP_OFF_P may be a period in which an emission signal EM is maintained at the gate-off voltage VGH and the plurality of pixels PX do not emit light.

Figure 8A:
Figure 8B:
Figure 8C:
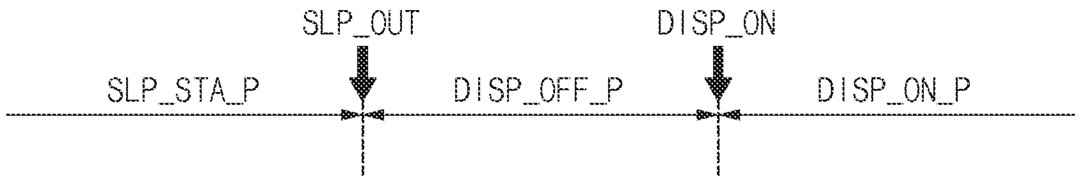
Figure 8D:
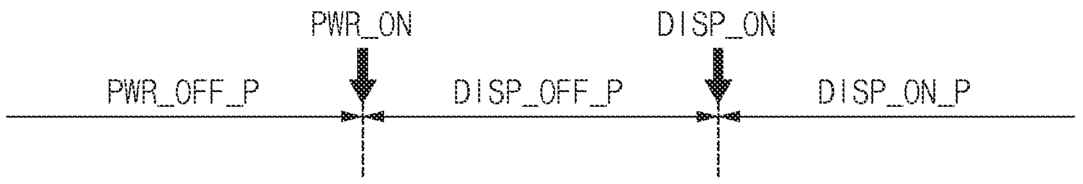

In some embodiments, as illustrated in FIGS. 8A and 8C, the display-off period DISP_OFF_P may be between the display-on period DISP_ON_P and a sleep state period SLP_STA_P. In some embodiments, as illustrated in FIGS. 8B and 8D, the display-off period DISP_OFF_P may be between the display-on period DISP_ON_P and a power-off period PWR_OFF_P. For example, as illustrated in FIG. 8A, in embodiments, when the display-off signal DISP_OFF is received in the display-on period DISP_ON_P, the display device 100 may enter the display-off period DISP_OFF_P. Further, when a sleep-in signal SLP_IN is received in the display-off period DISP_OFF_P, the display device 100 may enter the sleep state period SLP_STA_P. In the sleep state period SLP_STA_P, the panel driver 120 may stop generating voltages VREG, VGH and ELVDD. As illustrated in FIG. 8B, in embodiments, when a power-off signal PWR_OFF is received in the display-off period DISP_OFF_P, the display device 100 may enter the power-off period PWR_OFF_P. The power-off period PWR_OFF_P may refer to a period in which the display device 100 is powered off. In addition, as illustrated in FIG. 8C, in embodiments, when a sleep-out signal SLP_OUT is received in the sleep state period SLP_STA_P, the display device 100 may enter the display-off period DISP_OFF_P. Further, in embodiments, when a display-on signal DISP_ON is received in the display-off period DISP_OFF_P, the display device 100 may enter the display-on period DISP_ON_P in which the display panel 110 displays an image. As illustrated in FIG. 8D, in embodiments, when a power-on signal PWR_ON is received in the power-off period PWR_OFF_P, the display device 100 may enter the display-off period DISP_OFF_P.

Referring again to FIG. 7, in the method of operating the display device 100 according to embodiments, in the display-off period DISP_OFF_P, the panel driver 120 may output the gamma voltage VREG to the plurality of data lines (S370), may output the gate-off voltage VGH to the plurality of scan lines (S380), and may decrease the gamma voltage VREG such that a difference between the gate-off voltage VGH and the gamma voltage VREG becomes greater than or equal to a predetermined voltage margin (S390). In some embodiments, the predetermined voltage margin may be a voltage for turning off (e.g., completely turning off) the second transistor T2, and may be, but is not limited to, about 0.5V or about 0.6V.

In some embodiments, as illustrated in FIG. 9, in the display-off period DISP_OFF_P, the panel driver 120 may generate a decreased gamma voltage VREG' by decreasing the gamma voltage VREG to a predetermined low gamma voltage VLREG. Although FIG. 9 illustrates an example where the predetermined low gamma voltage VLREG is about 4.5V, the predetermined low gamma voltage VLREG is not limited to about 4.5V. The difference between the gate-off voltage VGH and the decreased gamma voltage VREG' may be greater than or equal to the predetermined voltage margin. Accordingly, in embodiments, in the display-off period DISP_OFF_P, a leakage current through the second transistor T2 does not occur, and flashing of the display panel 110 may be prevented.

In some embodiments, as illustrated in FIG. 10A, in the display-off period DISP_OFF_P, the panel driver 120 may generate a decreased gamma voltage VREG" by decreasing the gamma voltage VREG to the black data voltage VBLACK. Thus, a gate-source voltage of the second transistor T2 in the display-off period DISP_OFF_P may be maintained at the gate-source voltage of the second transistor T2 in the display-on period DISP_ON_P. Accordingly, in embodiments, in the display-off period DISP_OFF_P, the leakage current through the second transistor T2 does not occur, and flashing of the display panel 110 may be prevented.

Further, as illustrated in FIG. 10B, the black data voltage VBLACK may have different voltage levels with respect to different display devices DEV1 and DEV2. For example, the black data voltage VBLACK of a first display device DEV1 may be set to about 6.4V by a multi-time programming (MTP) operation of the first display device DEV1, and the black data voltage VBLACK of a second display device DEV2 may be set to about 6.2V by the MTP operation of the second display device DEV2. In this case, in the display-off period DISP_OFF_P, the first display device DEV1 may decrease the gamma voltage VREG from about 6.8V to about 6.4V, and the second display device DEV2 may decrease the gamma voltage VREG from about 6.8V to about 6.2V.

As described above, in the method of operating the display device 100 according to embodiments, the gamma voltage VREG may be decreased in the display-off period DISP_OFF_P. Accordingly, in the display-off period DISP_OFF_P, the leakage current in each pixel PX may be prevented, and flashing of the display panel 110 due to the leakage current may be prevented.

FIG. 11 is a flowchart illustrating a method of operating a display device according to embodiments. FIG. 12 is a timing diagram for describing an example where a gate-off voltage is increased in a display-off period. FIG. 13 is a timing diagram for describing an example where a gate-off voltage is increased in a display-off period.

A method illustrated in FIG. 11 may be substantially the same as a method illustrated in FIG. 7, except that a gate-off voltage VGH may be increased in a display-off period DISP_OFF_P. Thus, for convenience of explanation, a further description of elements and technical aspects previously described may be omitted.

Referring to FIGS. 1 and 11, in an active period of each frame period of the display-on period DISP_ON_P, a panel driver 120 may generate data voltages VDAT based on a gamma voltage VREG (S310), and may provide the data voltages VDAT and scan signals SS having a gate-on voltage VGL to a plurality of pixels PX of a display panel 110 (S320 and S330). In a blank period of each frame period of the display-on period DISP_ON_P, the panel driver 120 may output a black data voltage VBLACK to the plurality of data lines (S340), and may output the gate-off voltage VGH as the scan signals SS to the plurality of scan lines (S350). If the panel driver 120 does not receive a display-off signal DISP_OFF (S360: NO), the panel driver 120 may repeat the above-described operations (S310 through S350). When the panel driver 120 receives the display-off signal DISP_OFF (S360: YES), the display device 100 may enter a display-off period DISP_OFF_P.

In the method of operating the display device 100 according to embodiments, in the display-off period DISP_OFF_P, the panel driver 120 may output the gamma voltage VREG to the plurality of data lines (S370), may output the gate-off voltage VGH to the plurality of scan lines (S380), and may increase the gate-off voltage VGH such that a difference between the gate-off voltage VGH and the gamma voltage VREG becomes greater than or equal to a predetermined voltage margin (S395).

In some embodiments, as illustrated in FIG. 12, in the display-off period (DISP_OFF_P), the panel driver 120 may generate an increased gate-off voltage VGH' by increasing the gate-off voltage VGH to a predetermined high off voltage VOFFH. Although FIG. 12 illustrates an example where the predetermined high off voltage VOFFH is about 7.4V, the predetermined high off voltage VOFFH is not limited to about 7.4V. The difference between the increased gate-off voltage VGH' and the gamma voltage VREG may be greater than or equal to the predetermined voltage margin. Accordingly, in embodiments, in the display-off period DISP_OFF_P, a leakage current through a second transistor T2 does not occur, and flashing of the display panel 110 may be prevented.

In some embodiments, as illustrated in FIG. 13, in the display-off period DISP_OFF_P, the panel driver 120 may generate an increased gate-off voltage VGH" by increasing the gate-off voltage VGH to a voltage VMAR+VREG obtained by adding the predetermined voltage margin VMAR to the gamma voltage VREG. Thus, in the display-off period DISP_OFF_P, even if a voltage applied to a first terminal (e.g., a source) of the second transistor T2 is increased from the black data voltage VBLACK to the gamma voltage VREG, the difference between the increased gate-off voltage VGH" and the gamma voltage VREG may correspond to the voltage margin VMAR. Accordingly, in embodiments, in the display-off period DISP_OFF_P, the leakage current through the second transistor T2 does not occur, and flashing of the display panel 110 may be prevented. Although FIG. 13 illustrates an example where the voltage margin VMAR is about 0.6V, the voltage margin VMAR is not limited to about 0.6V.

As described above, in the method of operating the display device 100 according to embodiments, the gate-off voltage VGH may be increased in the display-off period DISP_OFF_P. Accordingly, in the display-off period DISP_OFF_P, the leakage current in each pixel PX may be prevented, and flashing of the display panel 110 due to the leakage current may be prevented.

FIG. 14 is a flowchart illustrating a method of operating a display device according to embodiments. FIG. 15A is a timing diagram for describing an example where a gamma voltage is decreased and a gate-off voltage is increased in a display-off period, and FIG. 15B is a timing diagram for describing examples where each of a gamma voltage and a gate-off voltage is adjusted to different voltage levels with respect to different display devices in a display-off period. FIG. 16 is a timing diagram for describing an example where each of a gamma voltage and a gate-off voltage is adjusted to different voltage levels with respect to different dimming levels in a display-off period.

A method illustrated in FIG. 14 may be substantially the same as a method illustrated in FIG. 7 or a method illustrated in FIG. 11, except that a gamma voltage VREG may be decreased and a gate-off voltage VGH may be increased in a display-off period DISP_OFF_P. Thus, for convenience of explanation, a further description of elements and technical aspects previously described may be omitted.

Referring to FIGS. 1 and 14, in an active period of each frame period of the display-on period DISP_ON_P, a panel driver 120 may generate data voltages VDAT based on the gamma voltage VREG (S310), and may provide the data voltages VDAT and scan signals SS having a gate-on voltage VGL to a plurality of pixels PX of a display panel 110 (S320 and S330). In a blank period of each frame period of the display-on period DISP_ON_P, the panel driver 120 may output a black data voltage VBLACK to the plurality of data lines (S340), and may output the gate-off voltage VGH as the scan signals SS to the plurality of scan lines (S350). If the panel driver 120 does not receive a display-off signal DISP_OFF (S360: NO), the panel driver 120 may repeat the above-described operations (S310 through S350). When the panel driver 120 receives the display-off signal DISP_OFF (S360: YES), the display device 100 may enter a display-off period DISP_OFF_P.

In the method of operating the display device 100 according to embodiments, in the display-off period DISP_OFF_P, the panel driver 120 may output the gamma voltage VREG to the plurality of data lines (S370), and may output the gate-off voltage VGH to the plurality of scan lines (S380). Further, the panel driver 120 may decrease the gamma voltage VREG (S390) and may increase the gate-off voltage VGH (S395) such that a difference between the gate-off voltage VGH and the gamma voltage VREG becomes greater than or equal to a predetermined voltage margin VMAR. For example, the panel driver 120 may decrease the gamma voltage VREG to a predetermined low gamma voltage VLREG or the black data voltage VBLACK, and may increase the gate-off voltage VGH to a predetermined high off voltage VOFFH or a voltage obtained by adding the predetermined voltage margin VMAR to the gamma voltage VREG.

In some embodiments, as illustrated in FIG. 15A, in the display-off period DISP_OFF_P, the panel driver 120 may generate a decreased gamma voltage VREG" by decreasing the gamma voltage VREG to the black data voltage VBLACK, and may generate an increased gate-off voltage VGH" by increasing the gate-off voltage VGH to a voltage obtained by adding the predetermined voltage margin VMAR to the black data voltage VBLACK. Thus, in the display-off period DISP_OFF_P, the difference between the increased gate-off voltage VGH'" and the decreased gamma voltage VREG" may correspond to the predetermined voltage margin VMAR. Accordingly, in embodiments, in the display-off period DISP_OFF_P, a leakage current through a second transistor T2 does not occur, and flashing of the display panel 110 may be prevented.

Further, as illustrated in FIG. 15B, the gamma voltage VREG and the gate-off voltage VGH may be adjusted to different voltage levels with respect to different display devices DEV1 and DEV2. For example, the black data voltage VBLACK of a first display device DEV1 may be set to about 6.4V by an MTP operation of the first display device DEV1, and the black data voltage VBLACK of a second display device DEV2 may be set to about 6.6V by an MTP operation of the second display device DEV2. In this case, in the display-off period DISP_OFF_P, the first display device DEV1 may adjust the gamma voltage VREG from about 6.8V to about 6.4V corresponding to the black data voltage VBLACK for the first display device DEV1, and may adjust the gate-off voltage VGH to about 7.0V, which is the black data voltage VBLACK for the first display device DEV1 plus the predetermined voltage margin VMAR. Further, in the display-off period DISP_OFF_P, the second display device DEV2 may adjust the gamma voltage VREG from about 6.8V to about 6.6V corresponding to the black data voltage VBLACK for the second display device DEV2, and may adjust the gate-off voltage VGH to about 7.2V, which is the black data voltage VBLACK for the second display device DEV2 plus the predetermined voltage margin VMAR.

Further, in some embodiments, as illustrated in FIG. 16, the gamma voltage VREG and the gate-off voltage VGH may be adjusted to different voltage levels at different dimming levels DBV1 through DBV6 (or different brightness values). That is, the black data voltage VBLACK may be set to a plurality of first voltage levels at the plurality of dimming levels DBV1 through DBV6. In the display-off period DISP_OFF_P, the gamma voltage VREG may be adjusted to the plurality of first voltage levels at the plurality of dimming levels DBV1 through DBV6, the gate-off voltage VGH may be adjusted to a plurality of second voltage levels at the plurality of dimming levels DBV1 through DBV6, and the plurality of second voltage levels may be higher by the predetermined voltage margin VMAR than the plurality of first voltage levels, respectively.

For example, the MTP operation may be performed at each of first through sixth dimming levels DBV1 through DBV6, and, as illustrated in FIG. 16, the black data voltage VBLACK may be set to about 6.4V at the first dimming level DBV1 corresponding to about 500 nits, may be set to about 6.3V at the second dimming level DBV2 corresponding to about 250 nits, may be set to about 6.2V at the third dimming level DBV3 corresponding to about 110 nits, may be set to about 6.1V at the fourth dimming level DBV4 corresponding to about 80 nits, may be set to about 6.0V at the fifth dimming level DBV5 corresponding to about 40 nits, and may be set to about 5.9V at the sixth dimming level DBV6 corresponding to about 20 nits. In this case, when entering the display-off period DISP_OFF_P at the first dimming level DBV1, the panel driver 120 may adjust the gamma voltage VREG to about 6.4V corresponding to the black data voltage VBLACK, and may adjust the gate-off voltage VGH to about 7.0V corresponding to the black data voltage VBLACK plus the predetermined voltage margin VMAR. Further, when entering the display-off period DISP_OFF_P at the second dimming level DBV2, the panel driver 120 may adjust the gamma voltage VREG to about 6.3V corresponding to the black data voltage VBLACK, and may adjust the gate-off voltage VGH to about 6.9V corresponding to the black data voltage VBLACK plus the predetermined voltage margin VMAR. Further, when entering the display-off period DISP_OFF_P at the third dimming level DBV3, the panel driver 120 may adjust the gamma voltage VREG to about 6.2V corresponding to the black data voltage VBLACK, and may adjust the gate-off voltage VGH to about 6.8V corresponding to the black data voltage VBLACK plus the predetermined voltage margin VMAR. Further, when entering the display-off period DISP_OFF_P at the fourth dimming level DBV4, the panel driver 120 may adjust the gamma voltage VREG to about 6.1V corresponding to the black data voltage VBLACK, and may adjust the gate-off voltage VGH to about 6.7V corresponding to the black data voltage VBLACK plus the predetermined voltage margin VMAR. Further, when entering the display-off period DISP_OFF_P at the fifth dimming level DBV5, the panel driver 120 may adjust the gamma voltage VREG to about 6.0V corresponding to the black data voltage VBLACK, and may adjust the gate-off voltage VGH to about 6.6V corresponding to the black data voltage VBLACK plus the predetermined voltage margin VMAR. Further, when entering the display-off period DISP_OFF_P at the sixth dimming level DBV6, the panel driver 120 may adjust the gamma voltage VREG to about 5.9V corresponding to the black data voltage VBLACK, and may adjust the gate-off voltage VGH to about 6.5V corresponding to the black data voltage VBLACK plus the predetermined voltage margin VMAR.

As described above, in the method of operating the display device 100 according to embodiments, in the display-off period DISP_OFF_P, the gamma voltage VREG may be decreased, and the gate-off voltage VGH may be increased. Accordingly, in the display-off period DISP_OFF_P, the leakage current in each pixel PX may be prevented, and flashing of the display panel 110 due to the leakage current may be prevented.

FIG. 17 is a block diagram illustrating an electronic device including a display device according to embodiments.

Referring to FIG. 17, an electronic device 1100 may include a host processor 1110, a memory device 1120, a storage device 1130, an input/output (I/O) device 1140, a power supply 1150 and a display device 1160. The electronic device 1100 may further include a plurality of ports for communicating with, for example, a video card, a sound card, a memory card, a universal serial bus (USB) device, other electronic devices, etc.

The host processor 1110 may perform various computing functions or tasks. The host processor 1110 may be, for example, an application processor (AP), a micro-processor, a central processing unit (CPU), etc. The host processor 1110 may be coupled to other components via, for example, an address bus, a control bus, a data bus, etc. Further, in some embodiments, the host processor 1110 may be further coupled to an extended bus such as, for example, a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be, for example, a solid state drive (SSD) device, a hard disk drive (HDD) device, a CD-ROM device, etc. The I/O device 1140 may be, for example, an input device such as a keyboard, a keypad, a mouse, a touch screen, etc., and an output device such as, for example, a printer, a speaker, etc. The power supply 1150 may supply power for operations of the electronic device 1100. The display device 1160 may be coupled to other components through the buses or other communication links.

In the display device 1160, in a display-off period, at least one of a gamma voltage applied to a data line and a gate-off voltage applied to a scan line may be adjusted. Accordingly, in the display-off period, a leakage current in each pixel may be prevented, and flashing of a display panel caused by the leakage current may be prevented.

Embodiments of The inventive concept may be applied to any electronic device 1100 including the display device 1160. For example, embodiments of the inventive concept may be applied to a television (TV), a digital TV, a 3D TV, a smartphone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

While the inventive concept has been particularly shown and described with reference to embodiments thereof, it will be understood by those of ordinary skill in the art that various changes in form and detail may be made therein without departing from the spirit and scope of the inventive concept as defined by the following claims.

What is claimed is:

1. A display device, comprising:

a display panel including a plurality of data lines, a plurality of scan lines, and a plurality of pixels connected to the plurality of data lines and the plurality of scan lines; and a panel driver configured to drive the display panel, wherein, in an active period of a frame period, the panel driver generates data voltages based on a gamma voltage, provides the data voltages to the plurality of pixels through the plurality of data lines, and provides scan signals having a gate-on voltage to the plurality of pixels through the plurality of scan lines, wherein, in a black period of the frame period, the panel driver outputs a black data voltage to the plurality of data lines, and outputs a gate-off voltage to the plurality of scan lines, and wherein, in a display-off period, the panel driver outputs the gamma voltage to the plurality of data lines, outputs the gate-off voltage to the plurality of scan lines, and adjusts at least one of the gamma voltage and the gate-off voltage.

2. The display device of claim 1, wherein the display-off period is between a display-on period and a sleep state period.

3. The display device of claim 1, wherein the display-off period is between a display-on period and a power-off period.

4. The display device of claim 1, wherein, in the display-off period, the panel driver decreases the gamma voltage such that a difference between the gate-off voltage and the gamma voltage becomes greater than or equal to a predetermined voltage margin.

5. The display device of claim 1, wherein the panel driver adjusts the gamma voltage to a predetermined low gamma voltage in the display-off period.

6. The display device of claim 1, wherein the panel driver adjusts the gamma voltage to the black data voltage in the display-off period.

7. The display device of claim 1, wherein, in the display-off period, the panel driver increases the gate-off voltage such that a difference between the gate-off voltage and the gamma voltage becomes greater than or equal to a predetermined voltage margin.

8. The display device of claim 1, wherein the panel driver adjusts the gate-off voltage to a predetermined high off voltage in the display-off period.

9. The display device of claim 1, wherein the panel driver adjusts the gate-off voltage to a voltage obtained by adding a predetermined voltage margin to the gamma voltage in the display-off period.

10. The display device of claim 1, wherein, in the display-off period, the panel driver decreases the gamma voltage and increases the gate-off voltage such that a difference between the gate-off voltage and the gamma voltage becomes greater than or equal to a predetermined voltage margin.

11. The display device of claim 1, wherein, in the display-off period, the panel driver adjusts the gamma voltage to the black data voltage, and adjusts the gate-off voltage to a voltage obtained by adding a predetermined voltage margin to the gamma voltage.

12. The display device of claim 1, wherein the black data voltage is set to a plurality of first voltage levels at a plurality of dimming levels, respectively, and wherein, in the display-off period, the gamma voltage is adjusted to the plurality of first voltage levels at the plurality of dimming levels, the gate-off voltage is adjusted to a plurality of second voltage levels at the plurality of dimming levels, and the plurality of second voltage levels are higher by a predetermined voltage margin than the plurality of first voltage levels, respectively.

13. The display device of claim 1, wherein the panel driver selectively performs an operation of adjusting at least one of the gamma voltage and the gate-off voltage in response to a command received from an external host processor.

14. A method of operating a display device, the method comprising:

generating data voltages based on a gamma voltage in an active period of a frame period;

providing the data voltages to a plurality of pixels through a plurality of data lines in the active period;

providing scan signals having a gate-on voltage to the plurality of pixels through a plurality of scan lines in the active period;

outputting a black data voltage to the plurality of data lines in a blank period of the frame period;

outputting a gate-off voltage to the plurality of scan lines in the blank period;

outputting the gamma voltage to the plurality of data lines in a display-off period;

outputting the gate-off voltage to the plurality of scan lines in the display-off period; and adjusting at least one of the gamma voltage and the gate-off voltage in the display-off period.

15. The method of claim 14, wherein adjusting at least one of the gamma voltage and the gate-off voltage includes:

decreasing the gamma voltage such that a difference between the gate-off voltage and the gamma voltage becomes greater than or equal to a predetermined voltage margin in the display-off period.

16. The method of claim 14, wherein adjusting at least one of the gamma voltage and the gate-off voltage includes:

adjusting the gamma voltage to a predetermined low gamma voltage in the display-off period.

17. The method of claim 14, wherein adjusting at least one of the gamma voltage and the gate-off voltage includes:

adjusting the gamma voltage to the black data voltage in the display-off period.

18. The method of claim 14, wherein adjusting at least one of the gamma voltage and the gate-off voltage includes:

increasing the gate-off voltage such that a difference between the gate-off voltage and the gamma voltage becomes greater than or equal to a predetermined voltage margin in the display-off period.

19. The method of claim 14, wherein adjusting at least one of the gamma voltage and the gate-off voltage includes:

decreasing the gamma voltage in the display-off period; and increasing the gate-off voltage in the display-off period.

20. The method of claim 14, wherein adjusting at least one of the gamma voltage and the gate-off voltage includes:

adjusting the gamma voltage to the black data voltage in the display-off period; and adjusting the gate-off voltage to a voltage obtained by adding a predetermined voltage margin to the gamma voltage in the display-off period.

* * * * *